US012614936B2

(12) United States Patent
Ono et al.

(10) Patent No.: US 12,614,936 B2
(45) Date of Patent: Apr. 28, 2026

(54) ROTATING ELECTRIC MACHINE AND METHOD FOR MANUFACTURING ROTOR

(71) Applicant: HONDA MOTOR CO., LTD., Tokyo (JP)

(72) Inventors: Yuji Ono, Wako (JP); Tomoya Otani, Wako (JP); Keiji Tada, Wako (JP); Kaoru Tomioka, Wako (JP); Tsutomu Yoshino, Wako (JP); Kimiaki Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

(21) Appl. No.: 18/330,456

(22) Filed: Jun. 7, 2023

(65) Prior Publication Data

US 2023/0402889 A1     Dec. 14, 2023

(30) Foreign Application Priority Data

Jun. 9, 2022    (JP) ................................. 2022-093532

(51) Int. Cl.
| | |
|---|---|
| *H02K 15/035* | (2025.01) |
| *H02K 1/278* | (2022.01) |
| *H02K 1/28* | (2006.01) |

(52) U.S. Cl.
CPC .............. *H02K 1/278* (2013.01); *H02K 1/28* (2013.01); *H02K 15/035* (2025.01); *H02K 2213/03* (2013.01)

(58) Field of Classification Search
CPC .......... H02K 1/278; H02K 1/28; H02K 15/03; H02K 15/035
See application file for complete search history.

(56) References Cited

U.S. PATENT DOCUMENTS

| | | | | |
|---|---|---|---|---|
| 2018/0316247 A1* | 11/2018 | Andonian | .............. | H02K 15/03 |
| 2019/0036430 A1* | 1/2019 | Takano | .................. | H02K 1/278 |
| 2019/0047684 A1* | 2/2019 | Linde | ...................... | B64C 21/10 |

FOREIGN PATENT DOCUMENTS

| | | | | | |
|---|---|---|---|---|---|
| EP | 2639462 A1 | * | 9/2013 | ............. | B60B 3/005 |
| JP | 11-150896 A | | 6/1999 | | |
| JP | 2001-136692 A | | 5/2001 | | |
| JP | 2014-050133 A | | 3/2014 | | |
| JP | 2018-027510 A | | 2/2018 | | |
| JP | 2020175603 A | * | 10/2020 | | |

OTHER PUBLICATIONS

Japanese Office Action Corresponding to JP Application No. 2022-093532 dated Sep. 2, 2025, 6 pages.

* cited by examiner

*Primary Examiner* — Livius R. Cazan
(74) *Attorney, Agent, or Firm* — Rankin, Hill & Clark LLP

(57) ABSTRACT

A rotor constituting a rotating electric machine includes a rotating shaft and a permanent magnet. A sleeve covering the outer surface of the permanent magnet is attached to the rotating shaft. The sleeve is made of a carbon fiber reinforced polymer. A resin film is joined to an outer circumferential wall of the sleeve via a joining material. A plurality of ridges are formed on the outer circumferential wall of the resin film. A riblet recessed relatively to the plurality of ridges is formed between the plurality of ridges.

7 Claims, 19 Drawing Sheets

ROTATING ELECTRIC MACHINE AND METHOD FOR MANUFACTURING ROTOR

CROSS-REFERENCE TO RELATED APPLICATIONS

This application is based upon and claims the benefit of priority from Japanese Patent Application No. 2022-093532 filed on Jun. 9, 2022, the contents of which are incorporated herein by reference.

BACKGROUND OF THE INVENTION

Field of the Invention

The present invention relates to a rotating electric machine including a rotor and a stator. The present invention also relates to a method of manufacturing a rotor constituting a rotating electric machine.

Description of the Related Art

A rotating electric machine including a rotor and a stator disposed outside of the rotor is known. Here, the rotor has permanent magnets provided on an outer circumferential wall of a rotating shaft. JP 2001-136692 A and JP 2020-175603 A each disclose a configuration for preventing permanent magnets from falling off from a rotating shaft. In the prior art described in JP 2001-136692 A, a heat-shrinkable film is provided on the outer surfaces of permanent magnets via a protective sheet. In the prior art described in JP 2020-175603 A, a sleeve made of a carbon fiber reinforced polymer is attached to the outer surfaces of permanent magnets. The permanent magnet is held on the rotating shaft via a heat-shrinkable film or sleeve.

A predetermined clearance is formed between the rotor and the stator. Therefore, an air layer is interposed between the rotor and the stator. When the rotating shaft rotates in this state, an air flow is generated around the rotor. In the case that a rotational speed of the rotating shaft is low, the air flow is laminar. On the other hand, in an aircraft or the like, it is assumed that a rotating shaft is rotated at a high speed. In this case, the air flow becomes turbulent. Under this condition, the frictional resistance of the rotor to the air layer increases. As a result, so-called windage loss occurs. If the permanent magnet is heated due to the windage loss, the energy conversion efficiency of the rotating electric machine decreases.

In the prior art described in JP 2020-175603 A, riblets are formed on the outer circumferential wall of the sleeve in order to reduce windage loss. Specifically, the prepreg is deformed into a cylindrical shape to obtain a sleeve, and then the transfer film is wound around the outer circumferential wall of the sleeve. A convex pattern is formed in advance on the transfer film, and the convex pattern is transferred to the outer circumferential wall of the sleeve. As a result, the riblets are formed on the outer circumferential wall. Thereafter, the sleeve is thermally cured and the transfer film is removed from the sleeve.

JP H11-150896 A describes that an armoring made of a non-magnetic material is attached to an outer circumferential surface of a rotor. Annular convex portions for promoting heat dissipation are formed on the outer circumferential wall of the armoring. The annular concave portion recessed relative to the annular convex portions is a groove. According to the description of JP H11-150896 A, an increase in windage loss is suppressed by the grooves. Titanium is exemplified as the material of the armor ring.

SUMMARY OF THE INVENTION

It is not easy to form a fine structure in a prepreg with high dimensional accuracy. Therefore, even if fine irregularities are formed on the transfer film, it is not easy to transfer the fine irregularities to the prepreg. For this reason, it is difficult to obtain a sleeve made of a carbon fiber reinforced polymer and having fine grooves.

JP 2020-175603 A describes depositing and fixing fine particles by thermal spraying or cold spraying in order to obtain an armoring having fine irregularities formed on the outer circumferential wall. However, based on such a method, it is not easy to obtain an armoring having rigidity enough to hold the permanent magnets. When a cylindrical body made of a metal such as titanium is used as an armoring, rigidity can be secured, but it is not easy to form fine irregularities on titanium or the like by machining or the like. Further, in this case, since the weight of the armoring is large, the weight of the rotor increases.

The present invention has the object of solving the aforementioned problems.

According to an embodiment of the present invention, there is provided a rotating electric machine including a rotor and a stator, the rotor including a rotating shaft and a permanent magnet held on the rotating shaft, and the stator including an electromagnetic coil surrounding the permanent magnet, wherein the rotor includes a sleeve covering an outer surface of the permanent magnet on the rotating shaft and being spaced apart from the stator by a predetermined distance, and a resin film joined to an outer circumferential wall of the sleeve via a joining material, and wherein the sleeve is made of a carbon fiber reinforced polymer, a ridge structure is formed on an outer circumferential wall of the resin film, the ridge structure including one or a plurality of convex portions forming a plurality of ridges extending parallel to each other, and a riblet recessed relative to the plurality of ridges is formed between the plurality of ridges.

According to another embodiment of the present invention, there is provided a method of manufacturing a rotor that includes a rotating shaft and a permanent magnet held on the rotating shaft and is surrounded by a stator in a rotating electric machine, the method including a sleeve attaching step of covering an outer surface of the permanent magnet by a sleeve made of a carbon fiber reinforced polymer, and a joining step of joining a resin film to an outer circumferential wall of the sleeve via a joining material, wherein a ridge structure is formed in advance on an outer circumferential wall of the resin film, and the joining step is performed to obtain the rotor in which the ridge structure is formed as one or a plurality of convex portions forming a plurality of ridges extending in parallel to each other, and a riblet recessed relative to the plurality of ridges is formed between the plurality of ridges.

Since it is difficult to process a sleeve made of a carbon fiber reinforced polymer, it is not easy to form riblets (or ridges) on the outer circumferential wall of the sleeve. On the other hand, in the present invention, the riblets are formed on the resin film covering the outer circumferential wall of the sleeve. Since the resin film is a separate body from the sleeve, it is not necessary to perform processing such as machining on the sleeve. Therefore, the occurrence of breakage such as cracking in the sleeve is avoided.

For example, by transferring a fine pattern provided on a mold to the resin film, fine ridges and riblets can be easily formed. In addition, the resin film is made of resin which is lighter than metal or the like. Therefore, an increase in the weight of the rotor is avoided.

The riblet reduces the turbulent vortex generated around the rotor even when the rotor rotates at a high speed. As a result, the turbulent friction viscosity is lowered and the generation of the Taylor vortex is suppressed. For the reasons described above, the windage loss can be reduced. As a result, the permanent magnet is prevented from heating up. Therefore, a decrease in the magnetic force of the permanent magnet is avoided, so that the energy conversion efficiency in the rotating electric machine is sufficiently increased.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 8 is still another example of a cross-sectional view of ridges formed on the resin film taken along the direction orthogonal to the extending direction of the ridges;

FIG. 9 is still another example of a cross-sectional view of ridges formed on the resin film taken along the direction orthogonal to the extending direction of the ridges;

FIG. 10 is still another example of a cross-sectional view of ridges formed on the resin film taken along the direction orthogonal to the extending direction of the ridges;

FIG. 12 is a schematic side view showing a state in which divided pieces of the sleeve are inserted over the rotating shaft provided with permanent magnets;

FIG. 14 is a schematic side view showing a state in which the positions of the outer circumferential walls of the divided pieces of the sleeve are aligned;

DETAILED DESCRIPTION OF THE INVENTION

In FIGS. 1 to 13, some components may be shown in an exaggerated manner for easy understanding. For this reason, FIGS. 1 to 13 do not show actual scales of the components.

Figure 1:
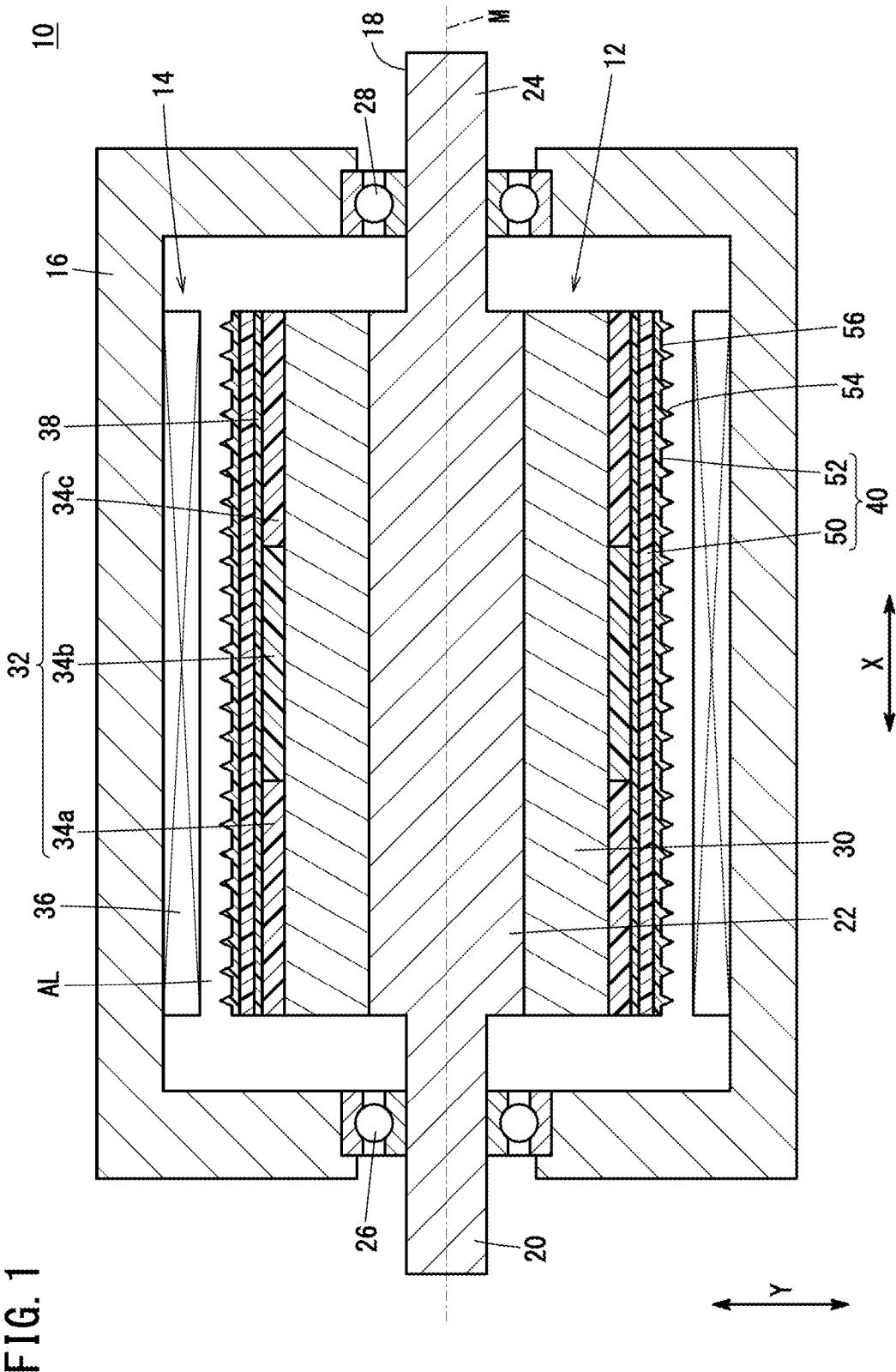
FIG. 1 is a schematic cross-sectional view of a rotating electric machine according to an embodiment of the present invention taken along an axial direction.

FIG. 1 is a schematic cross-sectional view of a rotating electric machine 10 according to the present embodiment taken along an axial direction (described later). The rotating electric machine 10 includes a rotor 12 and a stator 14. The stator 14 and most of the rotor 12 are housed in a casing 16.

The rotor 12 includes a rotating shaft 18. The rotating shaft 18 is a columnar body including a first small diameter portion 20, a large diameter portion 22, and a second small diameter portion 24. The centers of the first small diameter portion 20 and the second small diameter portion 24 coincide with the center of the large diameter portion 22. The direction in which the first small diameter portion 20, the large diameter portion 22, and the second small diameter portion 24 are arranged is an extending direction of the rotating shaft 18. Hereinafter, a line passing through the center of each of the first small diameter portion 20, the large diameter portion 22, and the second small diameter portion 24 and extending in the extending direction of the rotating shaft 18 may be referred to as an axis M, and a direction parallel to the axis M may be referred to as an axial direction. The axial direction is a direction of arrow X in FIG. 1. The diameters of the first small diameter portion 20, the large diameter portion 22, and the second small diameter portion 24 extend in a direction orthogonal to the axis M. Hereinafter, a direction in which the diameter extends may be referred to as a diametrical direction. The diametrical direction is a direction of arrow Y in FIG. 1.

The rotating shaft 18 is rotatably supported by the casing 16 via a first bearing 26 and a second bearing 28. Distal ends of the first small diameter portion 20 and the second small diameter portion 24 of the rotating shaft 18 are passed through the first bearing 26 and the second bearing 28, respectively, and are exposed from the casing 16. For example, a propeller or the like (not illustrated) is attached to a tip exposed from the casing 16.

Figure 2:
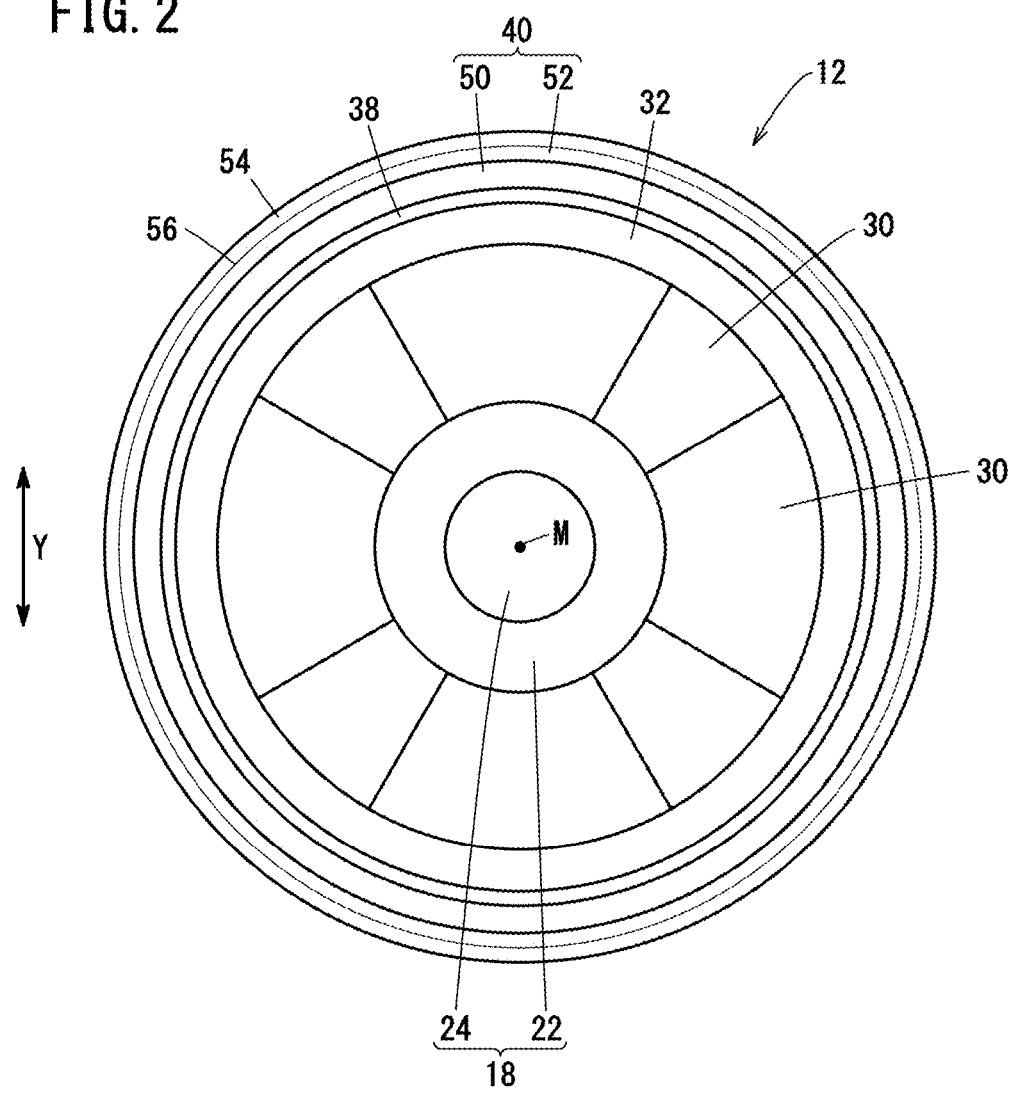
FIG. 2 is a schematic front view of the rotor when viewed in the axial direction.

As shown in FIGS. 1 and 2, permanent magnets 30 are disposed on an outer circumferential portion of the large diameter portion 22. The rotating shaft 18 is further provided with a sleeve 32. In the present embodiment, the sleeve 32 includes a first sleeve piece 34a, a second sleeve piece 34b, and a third sleeve piece 34c. Each of the first sleeve piece 34a, the second sleeve piece 34b, and the third sleeve piece 34c is a divided piece having a ring shape. That is, in this case, the sleeve 32 has a plurality of divided pieces. The first sleeve piece 34a, the second sleeve piece 34b, and the third sleeve piece 34c are substantially congruent with each other.

The first sleeve piece 34a, the second sleeve piece 34b, and the third sleeve piece 34c are arranged in the axial direction of the rotating shaft 18. One end surface of the first sleeve piece 34a is in contact with one end surface of the second sleeve piece 34b. Similarly, another end surface of the second sleeve piece 34b is in contact with one end surface of the third sleeve piece 34c. The first sleeve piece 34a, the second sleeve piece 34b, the second sleeve piece, and the third sleeve piece 34c are linearly arranged as described above and are in contact with each other as described above, to form the sleeve 32.

The first sleeve piece 34a, the second sleeve piece 34b, and the third sleeve piece 34c are formed of carbon fiber reinforced polymer or plastic (CFRP) and exhibit a certain degree of resilience. The CFRP is formed by impregnating carbon fibers with a matrix resin. Preferable examples of the matrix resin include an epoxy-based resin. The glass transition temperature of the epoxy-based resin is typically around 180° C.

The first sleeve piece 34a, the second sleeve piece 34b, and the third sleeve piece 34c that are arranged in the axial direction of the rotating shaft 18 cover an outer surface of each of the permanent magnets 30. Here, no external force is applied to the first sleeve piece 34a, the second sleeve piece 34b, and the third sleeve piece 34c before the rotating shaft 18 is inserted therethrough. This state is a so-called natural state. The inner diameters of the first sleeve piece 34a, the second sleeve piece 34b, and the third sleeve piece 34c each in the natural state are slightly smaller than the sum of the outer diameter of the rotating shaft 18 and the outer diameter of the permanent magnets 30. Therefore, when the first sleeve piece 34a, the second sleeve piece 34b, and the third sleeve piece 34c are inserted over the rotating shaft 18, the first sleeve piece 34a, the second sleeve piece 34b, and the third sleeve piece 34c are elastically deformed so as to slightly expand in diameter. Thereafter, the first sleeve piece 34a, the second sleeve piece 34b, and the third sleeve piece 34c are slightly reduced in diameter based on the elastic restoring force. Due to the elastic restoring force, the first sleeve piece 34a, the second sleeve piece 34b, and the third sleeve piece 34c press the permanent magnets 30 toward the rotating shaft 18. Based on this pressing, the permanent magnets 30 are held by the sleeve 32 on the outer circumferential portion of the rotating shaft 18. The thickness of each of the first sleeve piece 34a, the second sleeve piece 34b, and the third sleeve piece 34c is typically about 0.5 mm to 5 mm.

As shown in FIG. 1, the stator 14 includes an electromagnetic coil 36. The electromagnetic coil 36 is provided in a stator core (not shown). When the stator 14 is positioned and fixed to the casing 16 and the portions of the rotor 12 where the permanent magnets 30 are provided are housed in the casing 16, the electromagnetic coil 36 surrounds the permanent magnets 30 via the sleeve 32. When the permanent magnets 30 and the rotating shaft 18 integrally rotate, an alternating magnetic field is formed between the permanent magnets 30 and the electromagnetic coil 36.

As shown in FIGS. 1 and 2, a resin film 40 is joined to the outer circumferential wall of the sleeve 32 via a joining material 38. Preferable specific examples of the joining material 38 include a heat-resistant double-sided tape 42 shown in FIG. 16, a heat-resistant adhesive 44 shown in FIG. 18, and the like.

The resin film 40 covers the entire outer circumferential wall of the sleeve 32. As understood from FIG. 1, the sleeve 32 and the electromagnetic coil 36 are spaced apart from each other by a predetermined distance. Therefore, an air layer AL is interposed between the sleeve 32 and the electromagnetic coil 36.

Figure 3:
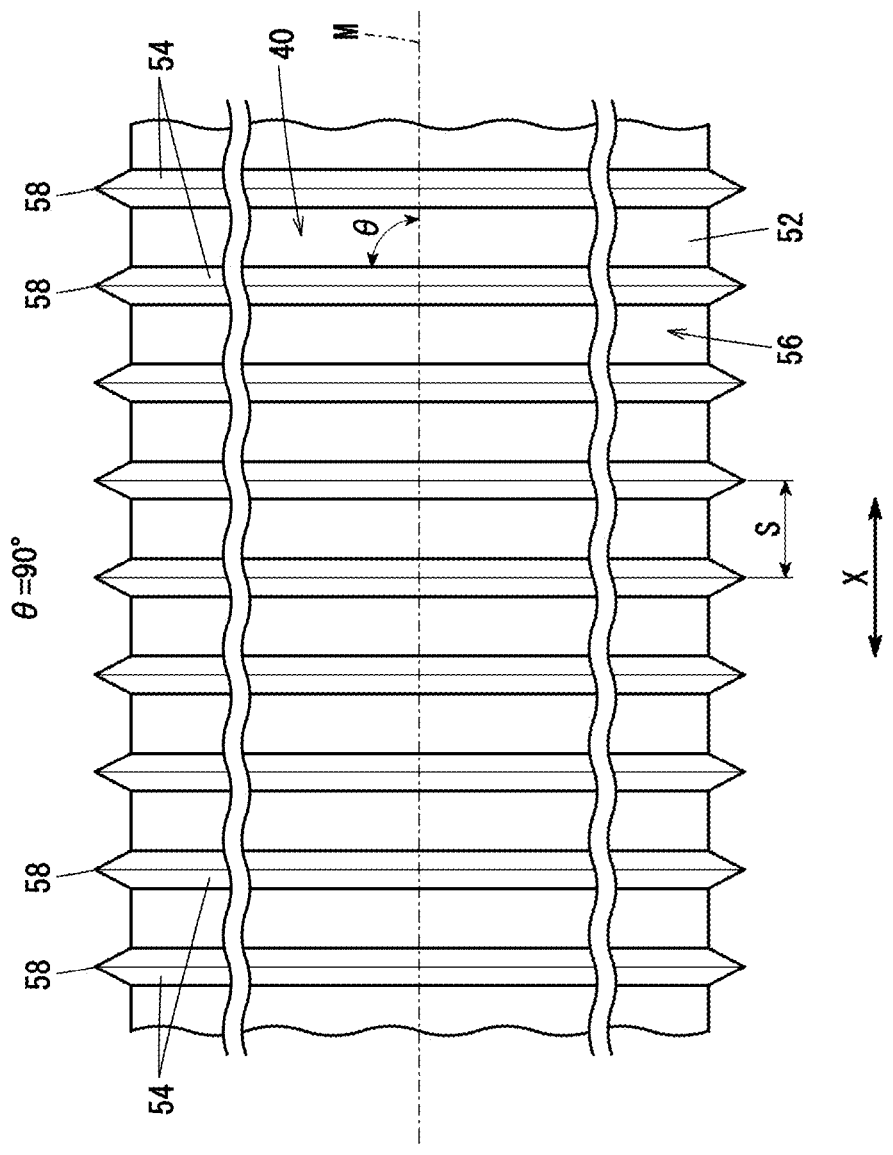
FIG. 3 is an example of an enlarged view of a main part of a resin film when the rotating shaft of the rotor is viewed in a direction orthogonal to the axial direction.

FIG. 3 is an enlarged view of a main part of the resin film 40 when the rotating shaft 18 is viewed in a direction orthogonal to the axial direction. In the present embodiment, the resin film 40 includes an inner layer 50 (see FIGS. 1 and 2) and an outer layer 52. The inner layer 50 and the outer layer 52 are both made of resin. The material of the inner layer 50 is preferably a resin excellent in heat resistance. Specific examples of such a resin include polycarbonate. On the other hand, the material of the outer layer 52 is preferably a resin that is easy to form a fine pattern, is easily joined to the inner layer 50 and excellent in heat resistance. Specific examples of such a resin include an ultraviolet curable resin such as an epoxy-based resin. The inner layer 50 and the outer layer 52 do not contain reinforcement fibers such as carbon fibers.

A ridge structure is formed on the outer circumferential wall of the outer layer 52. In the embodiment shown in FIG. 3, the ridge structure includes a plurality of convex portions annularly protruding outward in the diametrical direction of the rotating shaft 18. One ridge 54 is formed by one convex portion. Therefore, the ridge structure shown in FIG. 3 has a plurality of ridges 54 formed of a plurality of convex portions. Since the plurality of convex portions are arranged so as to be separated from each other at substantially equal intervals, two adjacent ones among the plurality of ridges 54 extend in parallel to each other. A portion between two ridges 54 adjacent to each other is a groove recessed relative to the two ridges 54. That is, a plurality of grooves are formed in the outer layer 52. The plurality of grooves form riblets 56 that are recessed relative to the ridges 54.

In the embodiment shown in FIG. 3, each of the ridges 54 is perpendicular to the axial direction of the rotating shaft 18. That is, in this case, an intersection angle θ between the extending direction of the ridges 54 and the axial direction of the rotating shaft 18 is 90°. Therefore, the ridges 54 protrude outward in the diametrical direction of the rotating shaft 18 and the sleeve 32. However, the intersection angle θ may be 45° or more, and is not limited to 90°. The intersection angle θ may be, for example, 75° as shown in FIG. 4 or 60° as shown in FIG.

Figure 4:
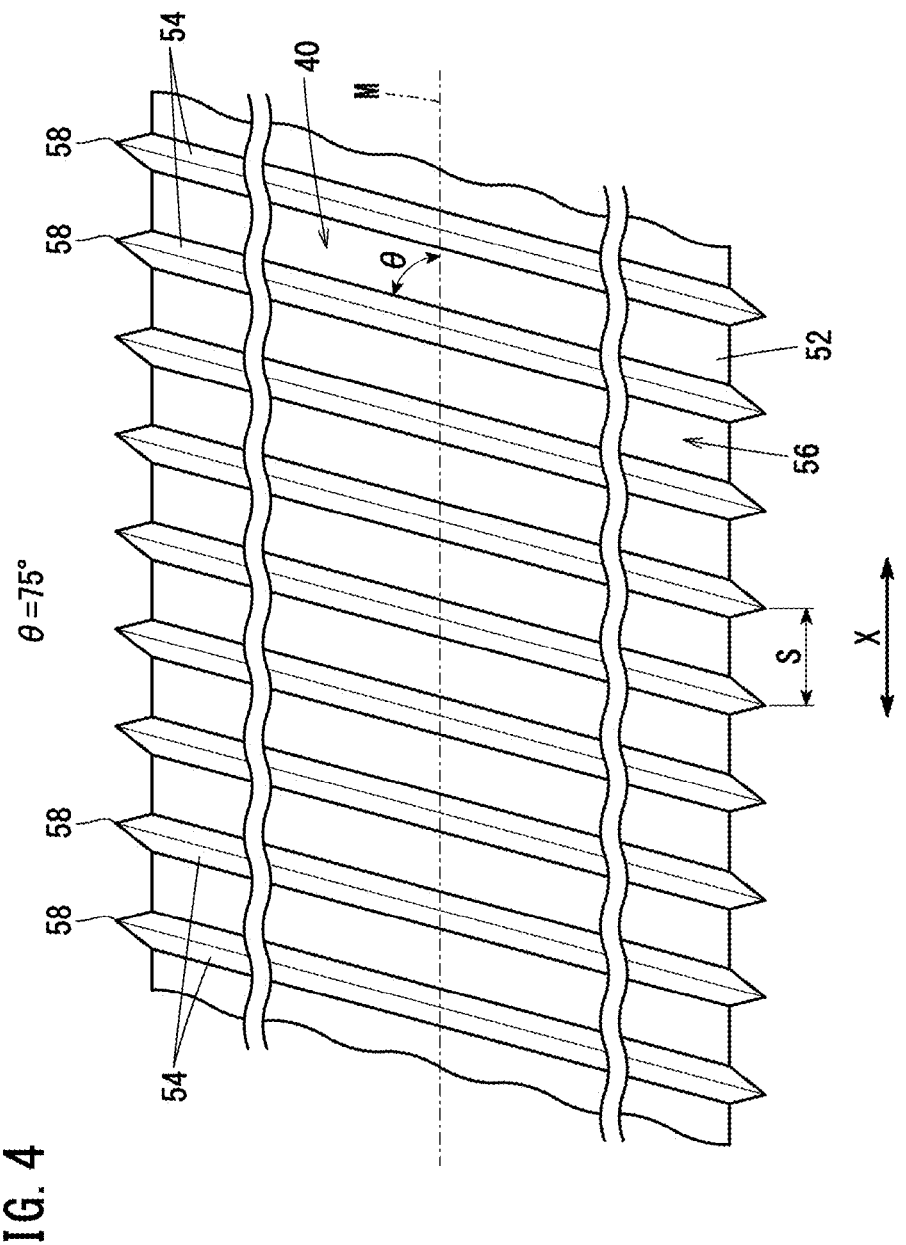
FIG. 4 is another example of an enlarged view of a main part of the resin film when the rotating shaft of the rotor is viewed in the direction orthogonal to the axial direction.
Figure 5:
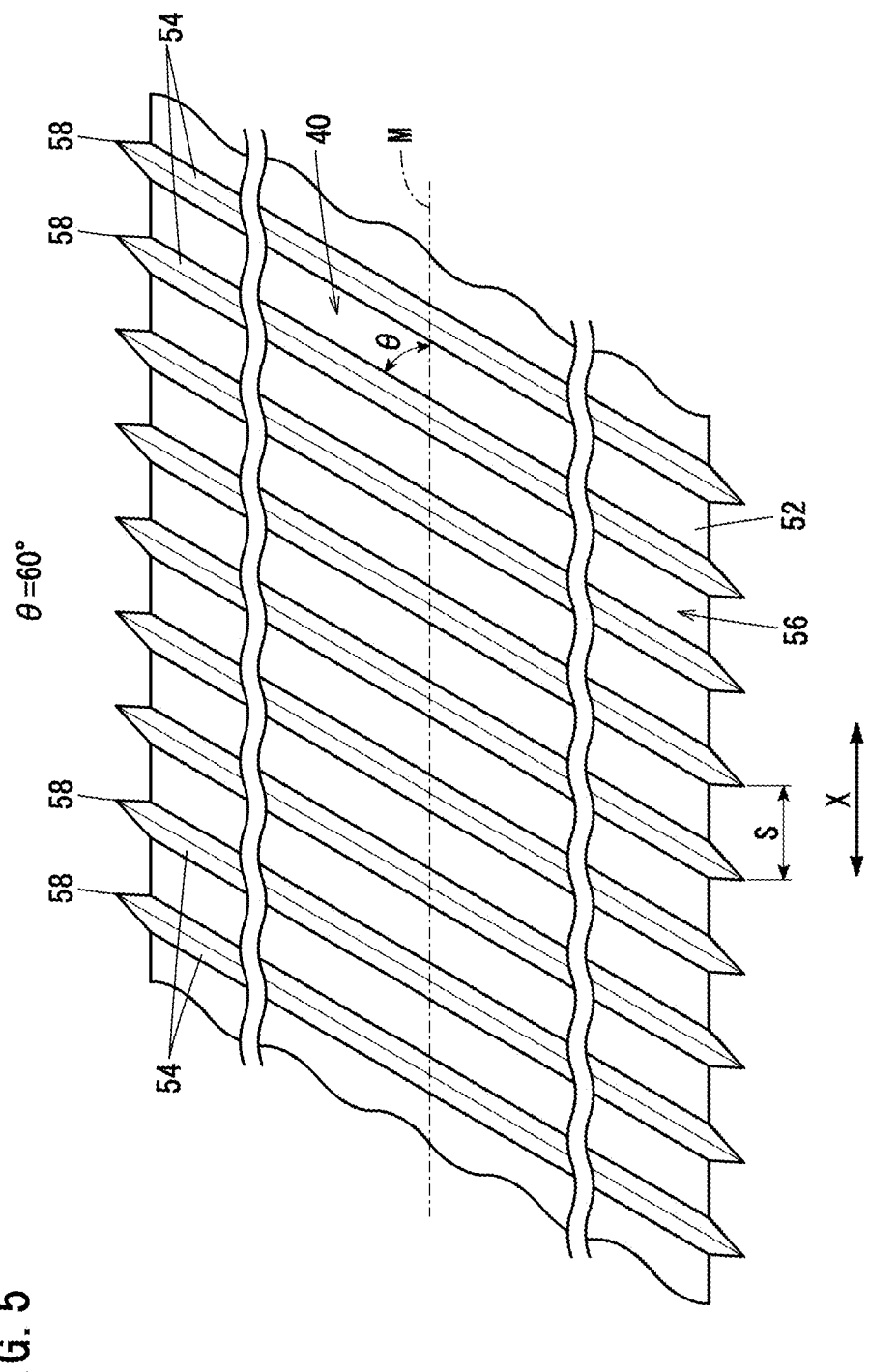
FIG. 5 is still another example of an enlarged view of a main part of the resin film when the rotating shaft of the rotor is viewed in the in the direction orthogonal to the axial direction.

In the embodiments shown in FIGS. 4 and 5, it is also possible to form a ridge structure extending in a spiral shape by forming one convex portion in a spiral shape. Also in this case, when the rotating shaft 18 is viewed in a direction orthogonal to the axial direction, a plurality of ridges 54 appear on the resin film 40. That is, this configuration shows "a plurality of ridges formed from one convex portion". Therefore, this configuration is also included in the "plurality of ridges" in the present specification.

Figure 6:
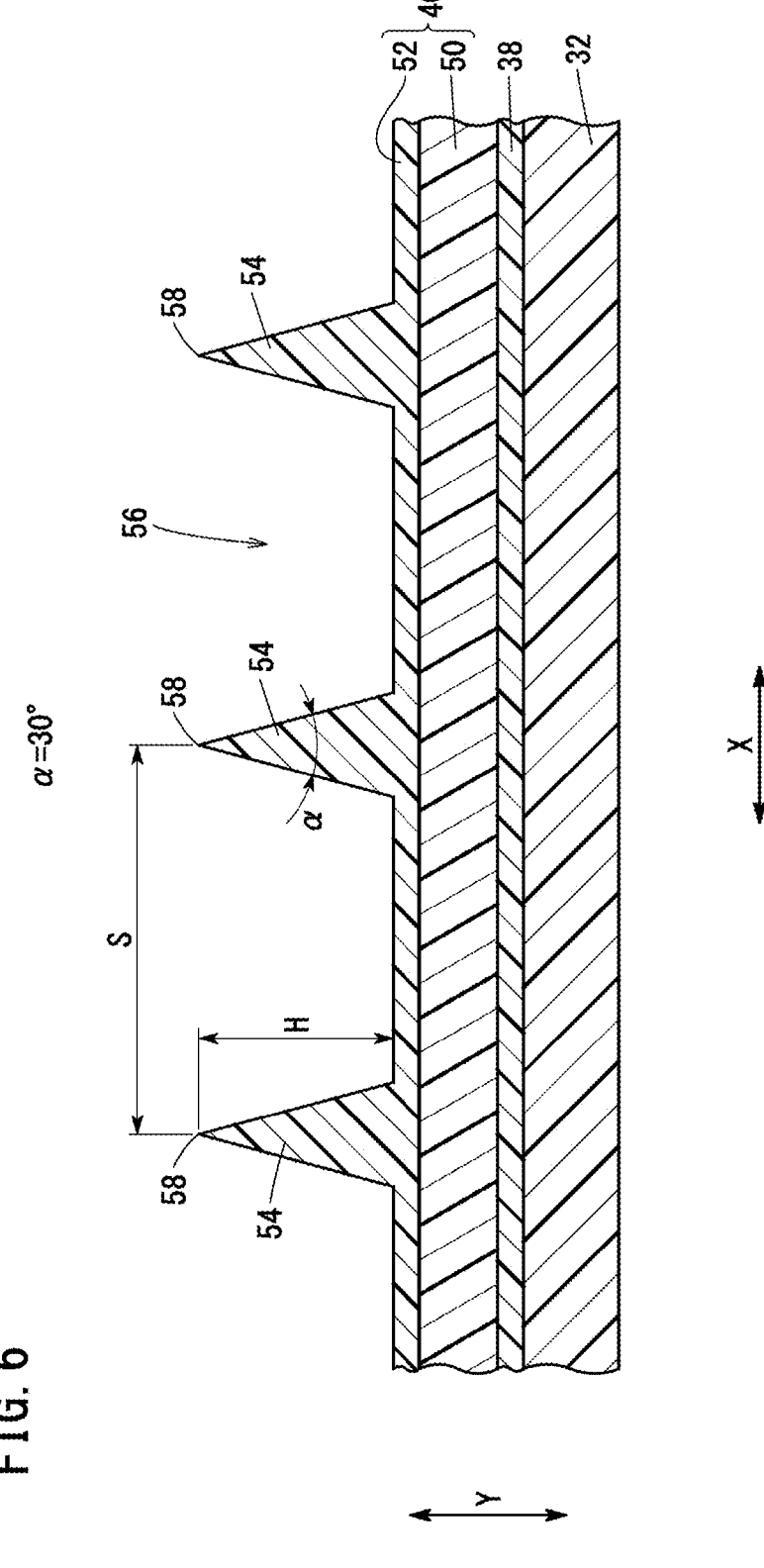
FIG. 6 is an example of a cross-sectional view of ridges formed on the resin film taken along a direction orthogonal to an extending direction of the ridges.

FIG. 6 is a schematic longitudinal sectional view when the sleeve 32 and the resin film 40 are cut along a direction orthogonal to the extending direction of the ridges 54. In the embodiment shown in FIG. 6, the extending direction of the ridges 54 corresponds to the diametrical direction of the rotating shaft 18.

Figure 7:
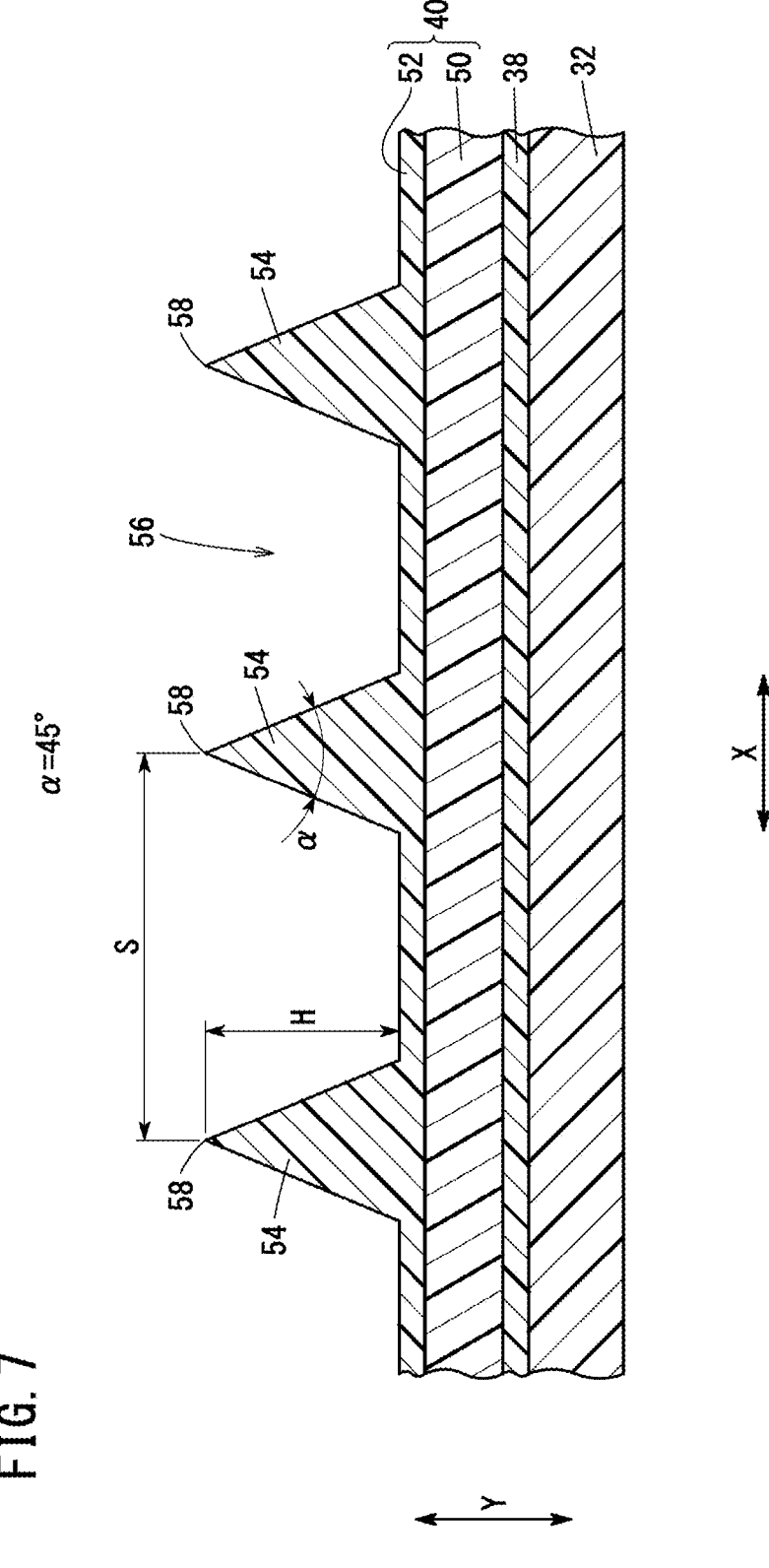
FIG. 7 is another example of a cross-sectional view of ridges formed on the resin film taken along the direction orthogonal to the extending direction of the ridges.
Figure 8:
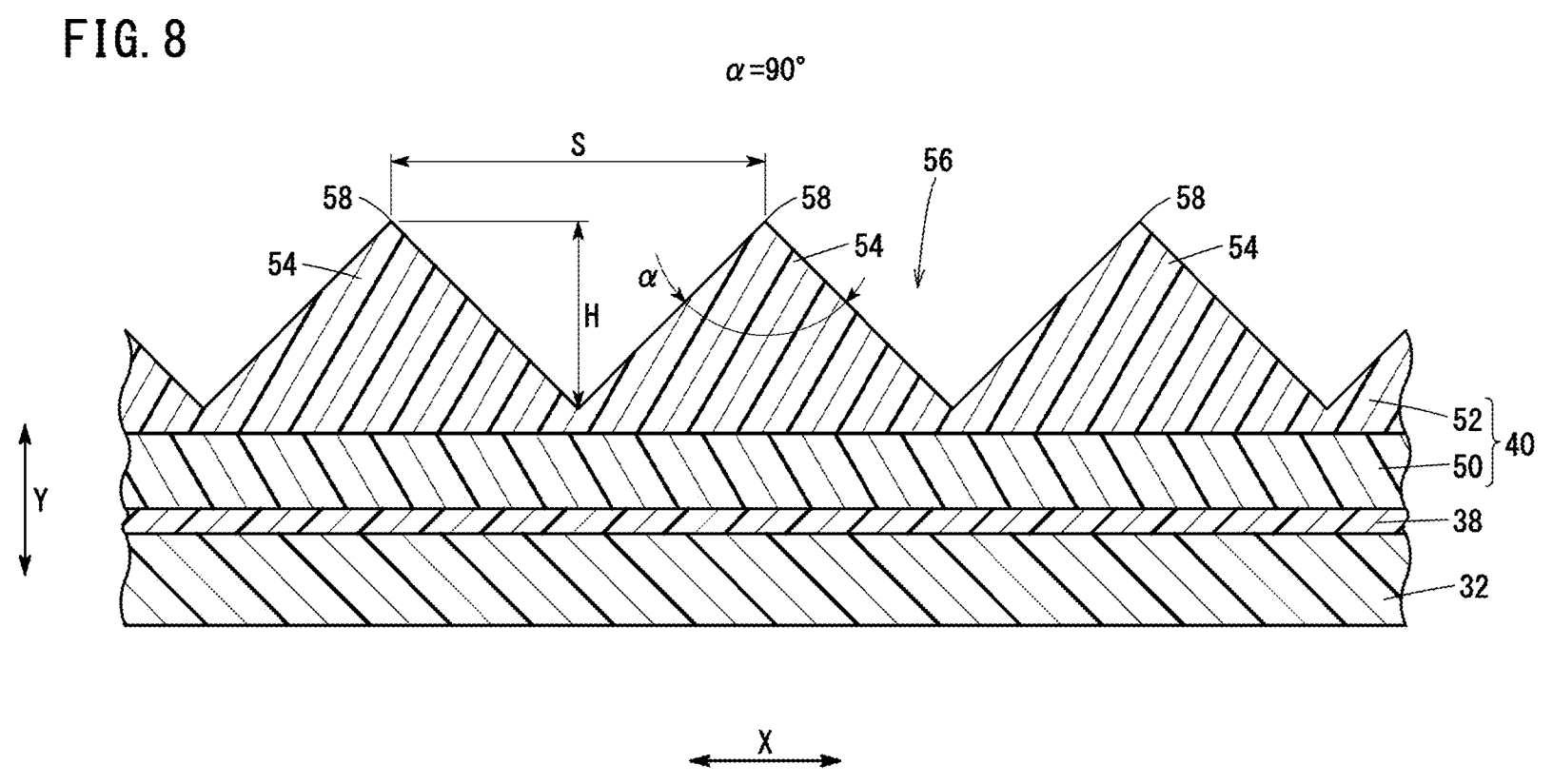
Figure 11:
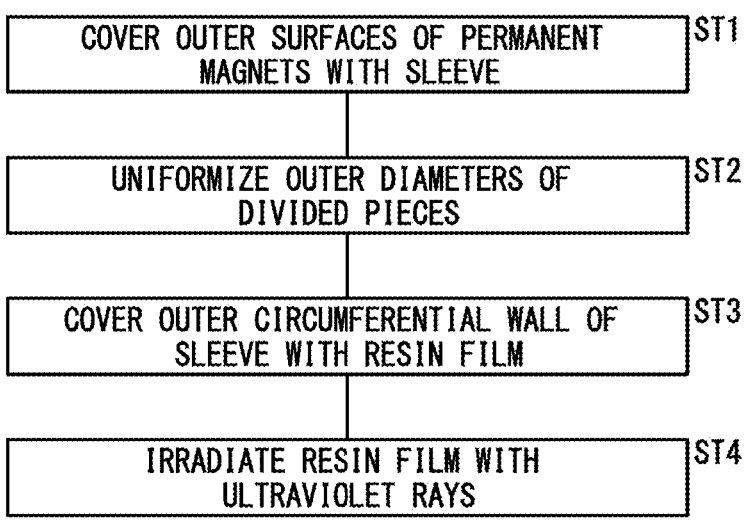
FIG. 11 is a schematic flow of a method for manufacturing a rotor according to an embodiment of the present invention.

As shown in FIG. 6, in this case, a cross section along the protruding direction of the ridges 54 appears. The cross-sectional shape of each of the ridges 54 at this time is typically an isosceles triangle. FIG. 6 illustrates a case where a top portion 58 of each of the ridges 54 that protrudes most outward in the diametrical direction of the rotating shaft 18 has an angle α of 30°. However, the angle α is not limited to °. As shown in FIG. 7, the angle α may be 45°. As shown in FIG. 8, the angle α may be 90°.

Figure 9:
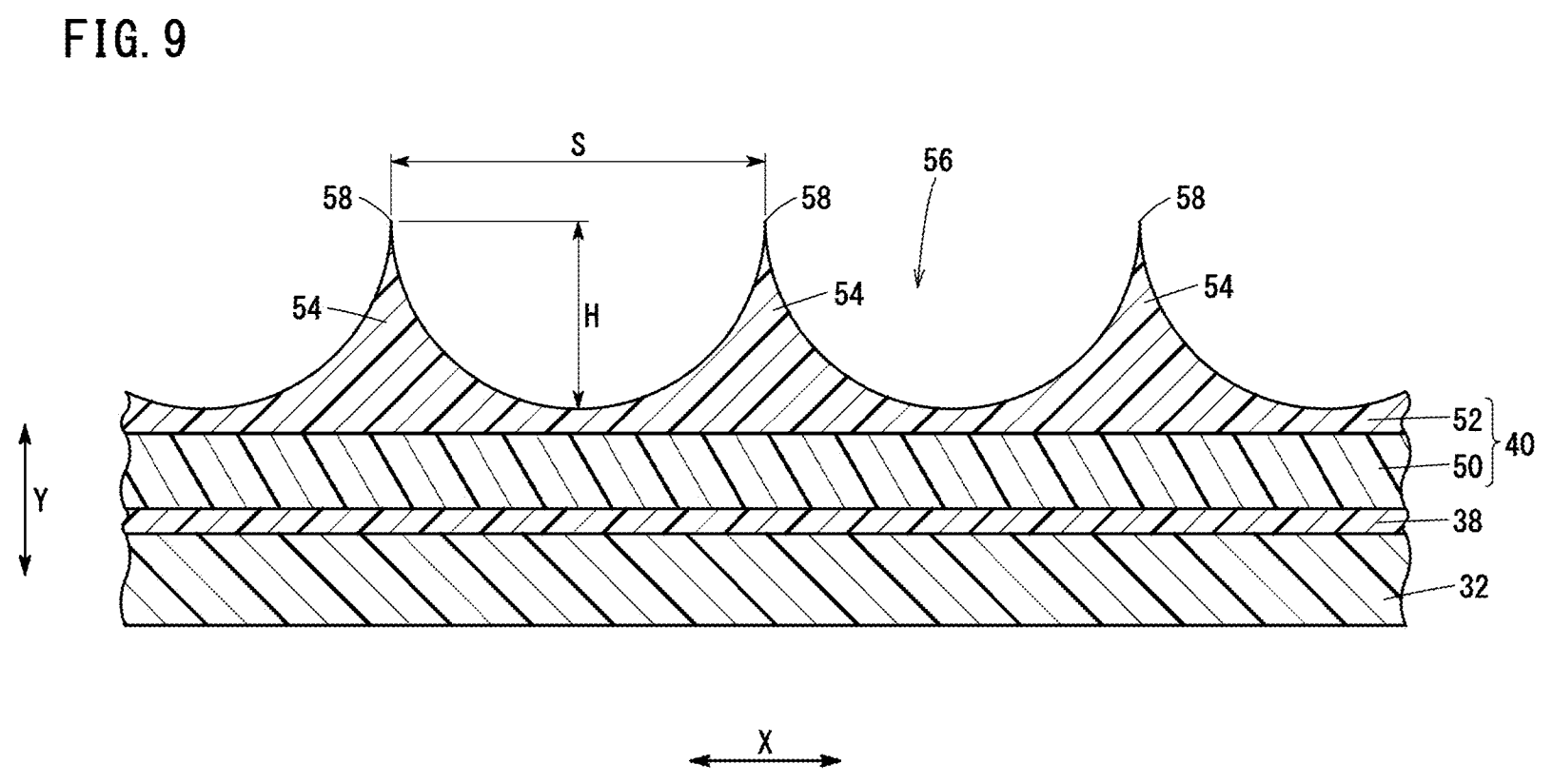
Figure 10:
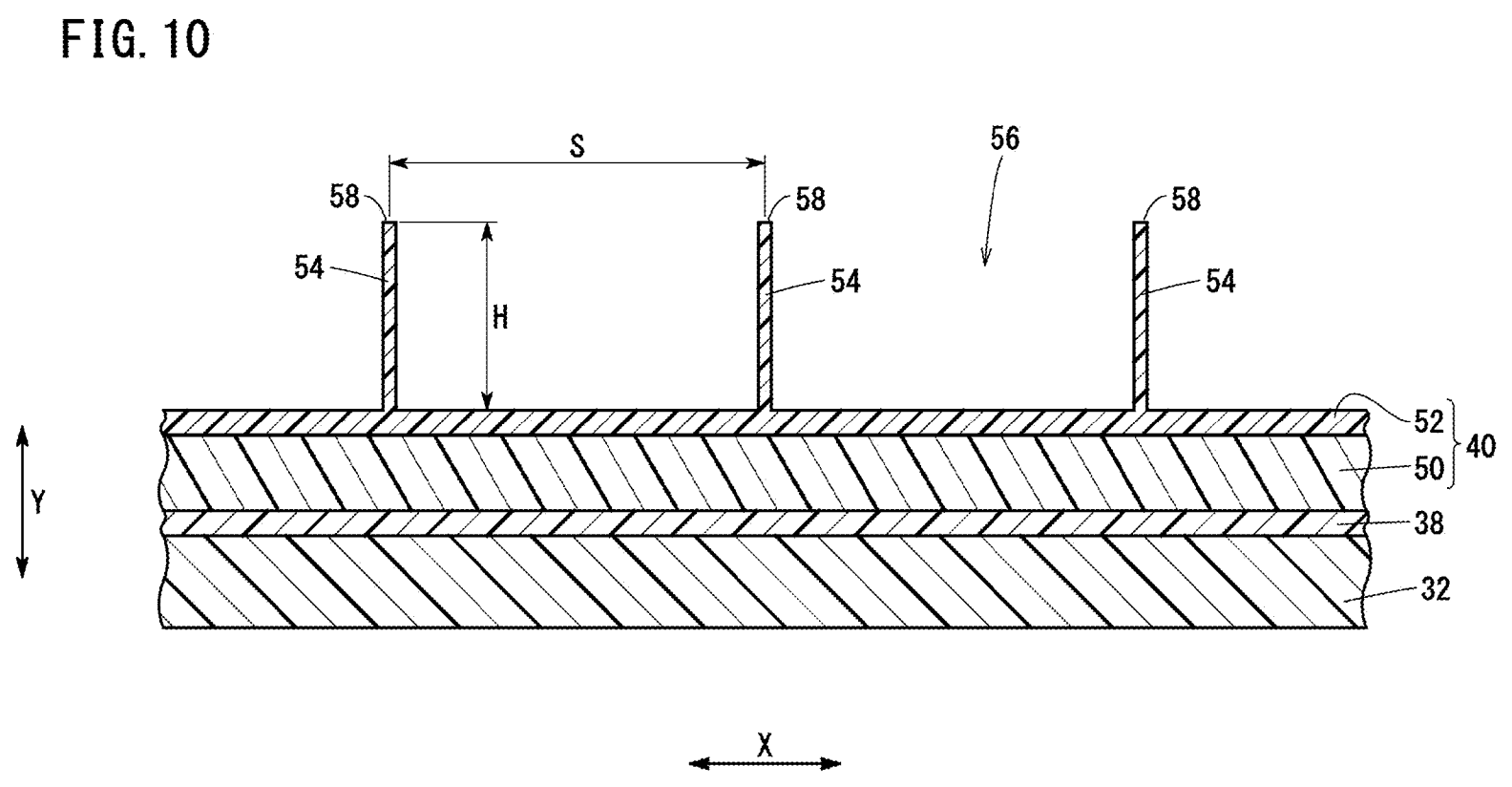

As shown in FIG. 9, the cross-section of the ridges 54 may have a wavy shape with rounded valleys. As shown in FIG. 10, the cross-section of each of the ridges 54 may be columnar (or rod-shaped). As understood with reference to FIGS. 6 to 10, each of the riblets 56 may be any one of a recessed groove having a flat bottom portion (FIGS. 6, 7, and 10), a V-shaped groove (FIG. 8), and a round groove having a bottom portion curved in an arc shape (FIG. 9).

A separation distance S between the top portion 58 of one ridge 54 and the top portion 58 of another ridge 54 adjacent to the one ridge 54 is defined as a pitch. In order to sufficiently suppress windage loss when the rotating shaft 18 rotates at a high speed, the pitch S is preferably 100 μm or less. If the pitch S is excessively small, it is difficult to form the ridges 54. Therefore, the pitch S is preferably in a range of 20 μm to 60 μm.

A distance H of one of the ridges 54 from a valley to the top portion 58 is defined as a height of the one ridge 54 (height H). In order to sufficiently reduce the windage loss while sufficiently increasing the aspect ratio of each of the riblets 56, the height H is preferably 50 μm or less. It is preferable for the height H and the pitch S to satisfy the following equation for the relation therebetween.

$$H = 0.5S$$

In the case that the pitch S is in the range of 20 μm to 60 μm, a preferable range of the height H is 10 μm to 30 μm.

The rotating electric machine 10 having the above-described configuration is mounted on, for example, an aircraft and used as a motor. When the motor is driven, the electromagnetic coil 36 shown in FIG. 1 is energized. With this energization, a magnetic field is formed around the electromagnetic coil 36. By a repulsive force or an attractive force acting between the magnetic field and the permanent magnets 30, the rotating shaft 18 starts to rotate about the axis M. Thus, a flow is generated in the air layer AL between the stator 14 and the resin film 40.

In a flying object, a motor may be required to rotate at a high speed. Here, in the present embodiment, the riblets 56 are formed in the resin film 40 provided on the outer circumferential wall of the sleeve 32. Moreover, the pitch S between two adjacent ridges 54 among the plurality of ridges 54 for forming each of the riblets 56 is preferably 100 μm or less. Therefore, even in the case that the rotating shaft 18 rotates at a high speed, the turbulent vortex generated around the rotor 12 is reduced. As a result, the turbulent flow friction viscosity is lowered and the generation of the Taylor vortex is suppressed. For the reasons described above, the windage loss can be reduced.

That is, according to the present embodiment, the windage loss is sufficiently suppressed. Thus, the permanent magnets 30 are prevented from heating up. Therefore, a decrease in the magnetic force of each of the permanent magnets 30 is avoided, so that the energy conversion efficiency in the rotating electric machine 10 is sufficiently increased. That is, the electric energy input to the electromagnetic coil 36 is efficiently converted into the driving force for rotating the rotating shaft 18.

In the case that the rotating electric machine 10 is used as a generator, the driving force for rotating the rotating shaft 18 is efficiently converted into electric energy that is output from the electromagnetic coil 36. As described above, according to the present embodiment, the response characteristic of the rotating electric machine 10 is improved.

In the case that the inner layer 50 and the outer layer 52 of the resin film 40 is a heat-resistant resin, the resin film 40 exhibits excellent heat resistance. Therefore, even when the rotor 12 rotates at a high speed, the shape of the ridges 54 is maintained. Moreover, the resin film 40 is firmly joined to the sleeve 32 made of the carbon fiber reinforced polymer by the joining material 38. Therefore, even when the rotor 12 rotates at a high speed, the resin film 40 is prevented from falling off from the sleeve 32. For the reasons described above, even when the rotating electric machine 10 is continuously operated for a long time, it is possible to avoid an increase in windage loss during operation of the rotating electric machine 10.

Next, a method of manufacturing the rotor 12 constituting the rotating electric machine 10 will be described. Here, as shown in a schematic flow of FIG. 11, a sleeve attaching step ST1, a machining step ST2, a joining step ST3, and an ultraviolet irradiating step ST4 are performed.

In order to obtain the sleeve 32 made of the carbon fiber reinforced polymer, the prepreg is curved into a cylindrical shape, and heat is applied to the prepreg in this state. As a result, the matrix resin in the prepreg is cured to obtain the first sleeve piece 34a. Similarly, the second sleeve piece 34b and the third sleeve piece 34c are manufactured. The length of each of the first sleeve piece 34a to the third sleeve piece 34c in the axial direction is smaller than the length of the sleeve 32 in the axial direction. Therefore, it is easier to manufacture the first sleeve piece 34a to the third sleeve piece 34c than to manufacture the sleeve 32 as a single member. The thickness of each of the first sleeve piece 34a to the third sleeve piece 34c is, for example, about 0.5 mm to 5 mm.

Figure 12:
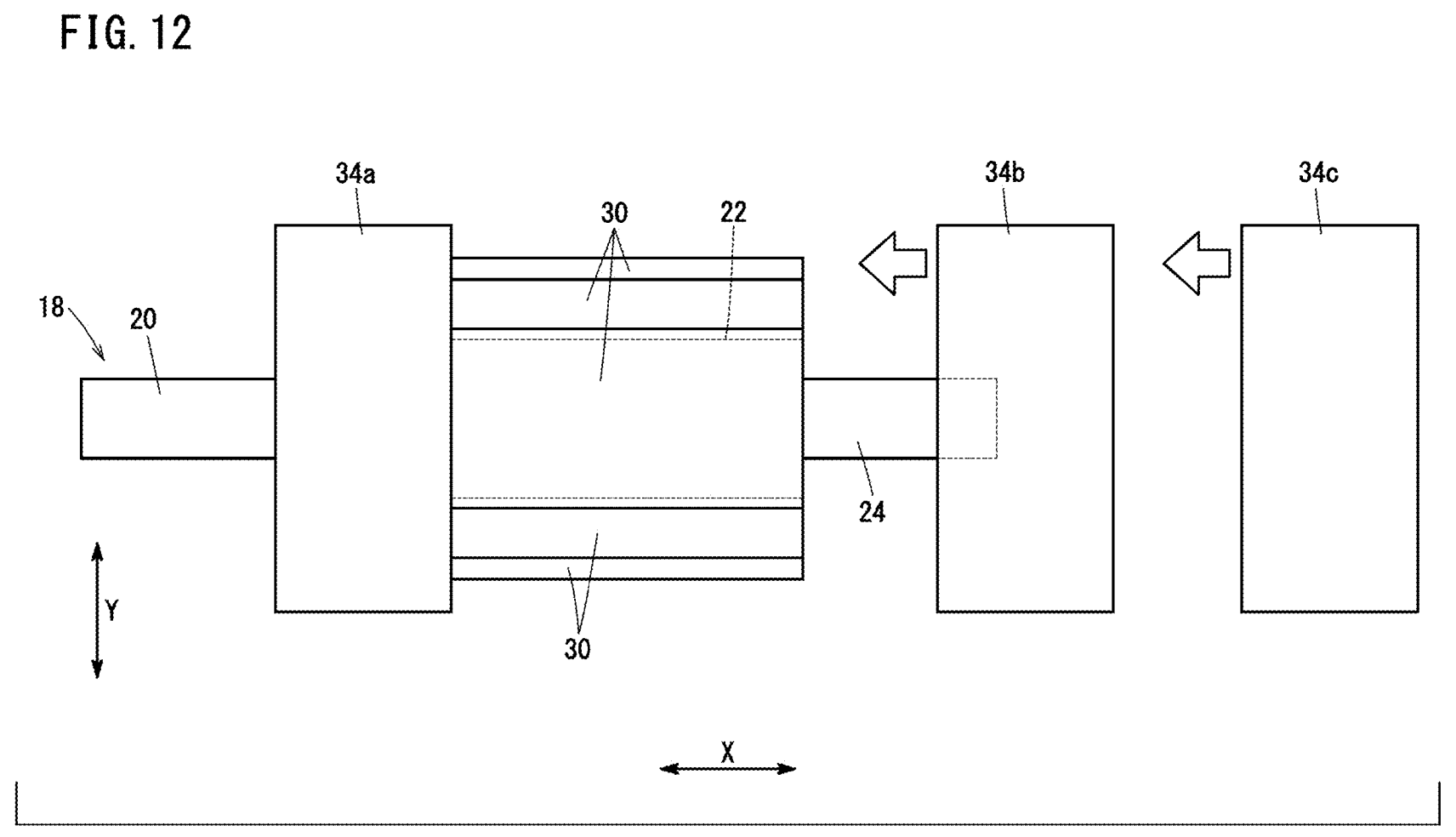

First, in the sleeve attaching step ST1, the outer surfaces of the permanent magnets 30 are covered by the first sleeve piece 34a to the third sleeve piece 34c obtained as described above. That is, as shown in FIG. 12, the first sleeve piece 34a to the third sleeve piece 34c are sequentially inserted over the large diameter portion 22 provided with the permanent magnets 30. One end surface of the first sleeve piece 34a comes into contact with one end surface of the second sleeve piece 34b. Another end surface of the second sleeve piece 34b comes into contact with one end surface of the third sleeve piece 34c. As a result, the first sleeve piece 34a to the third sleeve piece 34c are arranged in the axial direction of the rotating shaft to form the sleeve 32.

Figure 13:
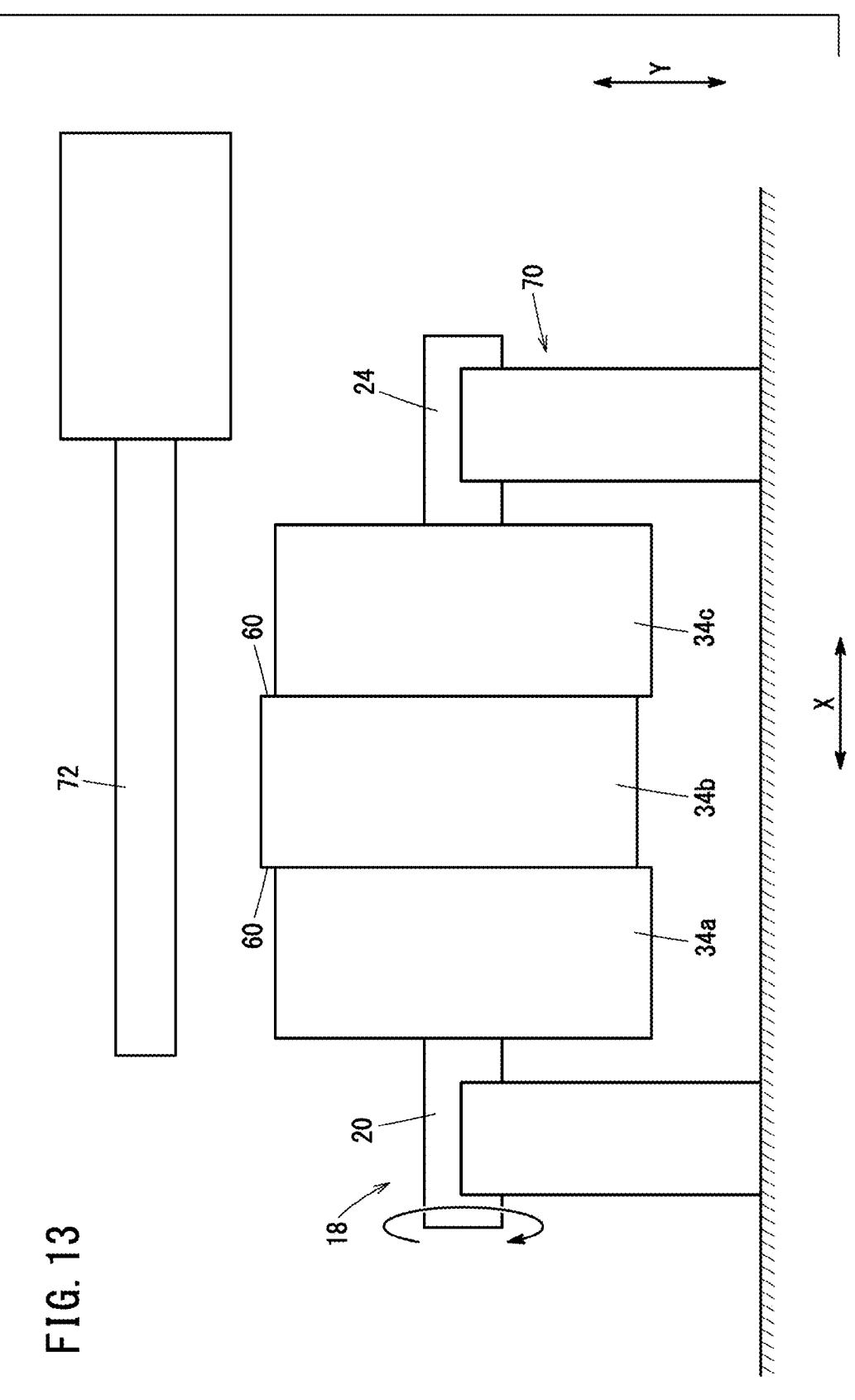
FIG. 13 is a schematic side view showing a state in which machining is performed on the sleeve attached to the rotating shaft.

When the first sleeve piece 34a to the third sleeve piece 34c are inserted over the large diameter portion 22, the first sleeve piece 34a to the third sleeve piece 34c slightly increase in diameter due to elastic deformation, and then slightly decrease in diameter due to elastic restoring force. As a result, the sleeve 32 presses the permanent magnets 30 toward the center of the rotating shaft 18. Accordingly, as shown in FIG. 13, the permanent magnets 30 are held on the outer circumferential portion of the large diameter portion 22 by the sleeve 32.

The first sleeve piece 34a to the third sleeve piece 34c may have a difference in the outer diameter due to manufacturing errors. Alternatively, the centers of the first sleeve piece 34a to the third sleeve piece 34c may not coincide with each other. In such a case, as shown in FIG. 13, steps 60 are formed between the first sleeve piece 34a and the second sleeve piece 34b and between the second sleeve piece 34b and the third sleeve piece 34c. FIG. 13 illustrates a state in which the outer diameters and centers of the first sleeve piece 34a and the third sleeve piece 34c coincide with each other, and the second sleeve piece 34b is eccentric with respect to the first sleeve piece 34a and the third sleeve piece 34c.

In the case that the step 60 is out of an allowable range, machining is performed on the first sleeve piece 34a to the third sleeve piece 34c in the machining step ST2. Specifically, the first small diameter portion 20 and the second small diameter portion 24 of the rotating shaft 18 are supported by the rotation mechanism 70. In this state, a cutting tool 72 (an end mill, a turning tool, or the like) shown in FIG. 13 is brought into sliding contact with the sleeve 32 while the rotating shaft 18 is rotated about the axis M. Accordingly, a part of the outer circumferential wall of each of the first sleeve piece 34a to the third sleeve piece 34c is machined. That is, the first sleeve piece 34a to the third sleeve piece 34c are thinned.

Figure 14:
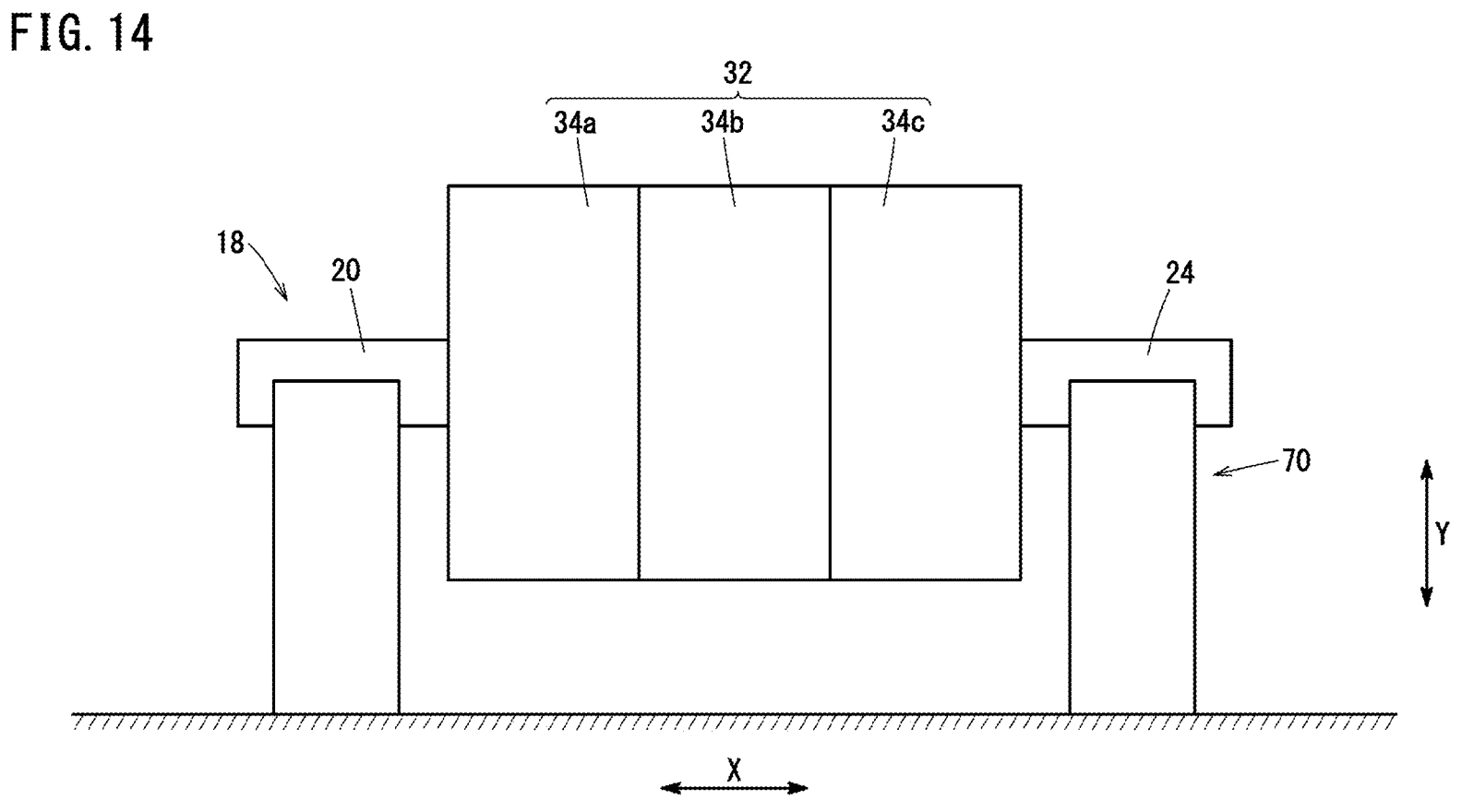

As a result, as shown in FIG. 14, the sleeve 32 in which the steps 60 are within the allowable range is obtained. When the step 60 is within the allowable range at the time of forming the sleeve 32, it is not particularly necessary to perform the machining step ST2. In this case, after the sleeve attaching step ST1 is completed, the joining step ST3 is performed. Before performing the joining step ST3, the outer circumferential wall of the sleeve 32 may be subjected to a surface treatment for improving the joining strength.

Figure 15:
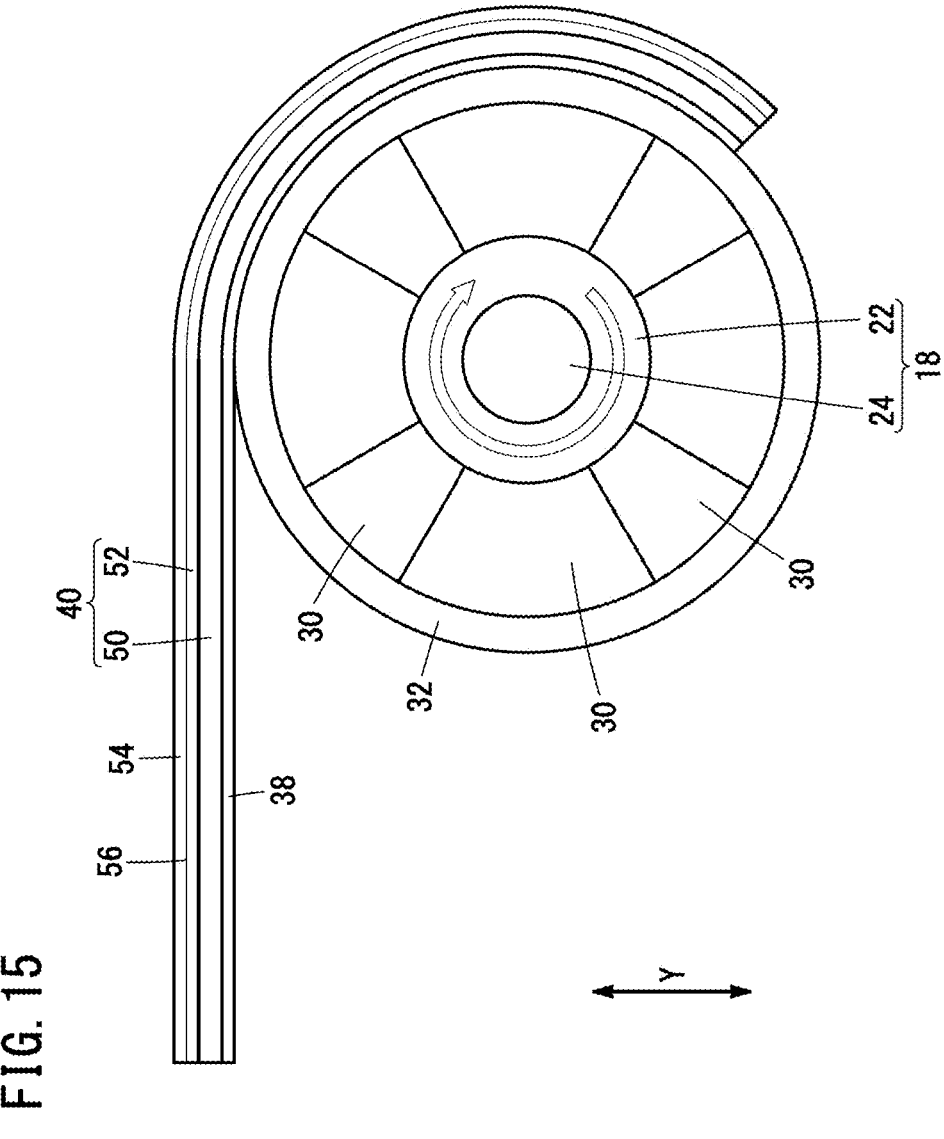
FIG. 15 is a schematic side view showing a state in which the resin film is joined to the sleeve attached to the rotating shaft.

Next, in the joining step ST3, as shown in FIG. 15, while the rotating shaft 18 is rotated at a low speed, the resin film manufactured in advance is joined to the outer circumferential wall of the sleeve 32. For the reason described above, at this time, it is preferable for the resin film 40 to be joined to the outer circumferential wall of the sleeve 32 in the manner so that an intersection angle θ (see FIGS. 3 to 5) between the extending direction of the ridges 54 formed in advance on the outer layer 52 and the axial direction of the rotating shaft 18 is 45° to 90°.

Figure 16:
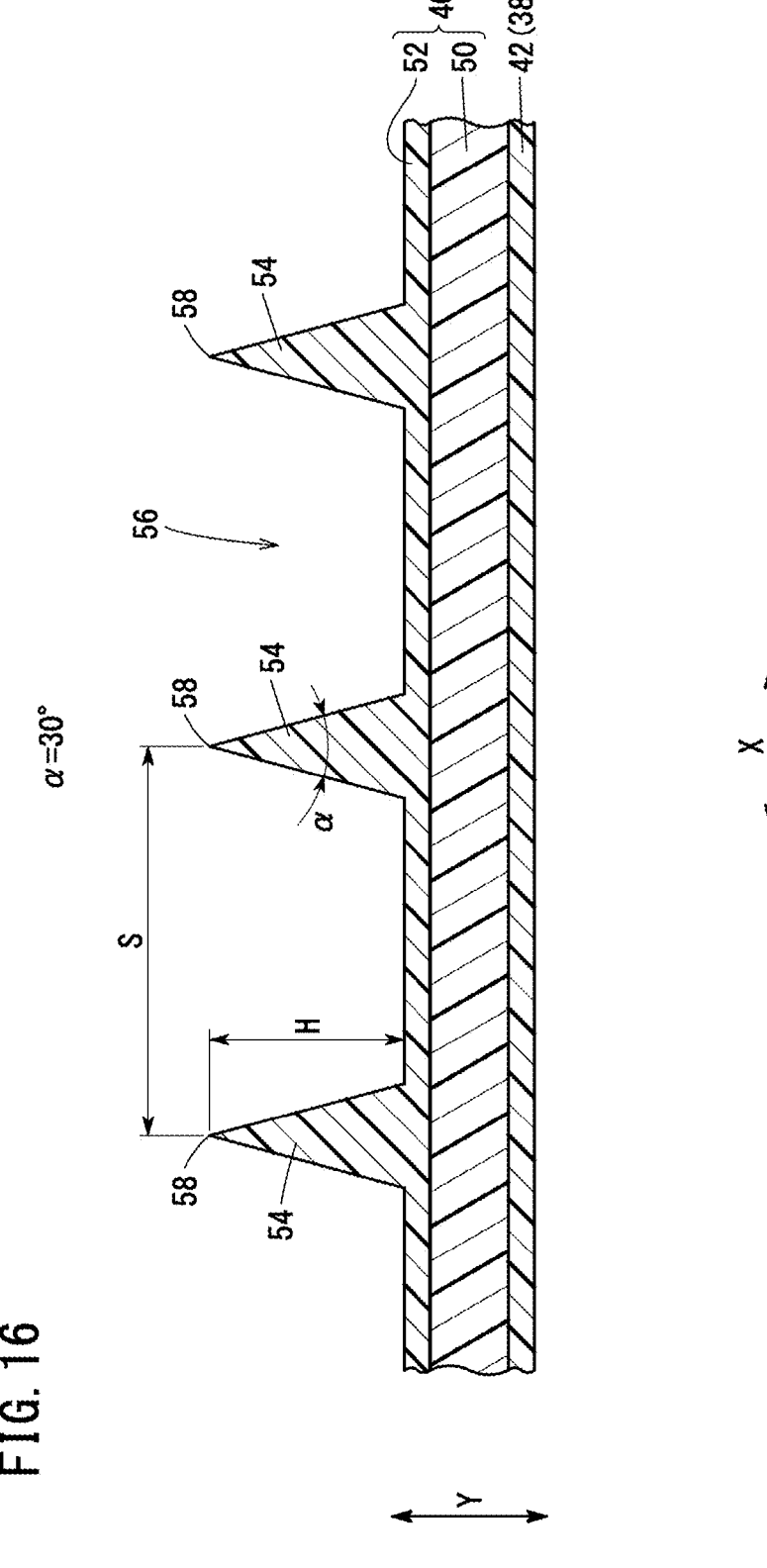
FIG. 16 is a schematic side view of a resin film to which a heat-resistant double-sided tape as an example of a joining material is joined in advance, taken along a thickness direction.
Figure 17:
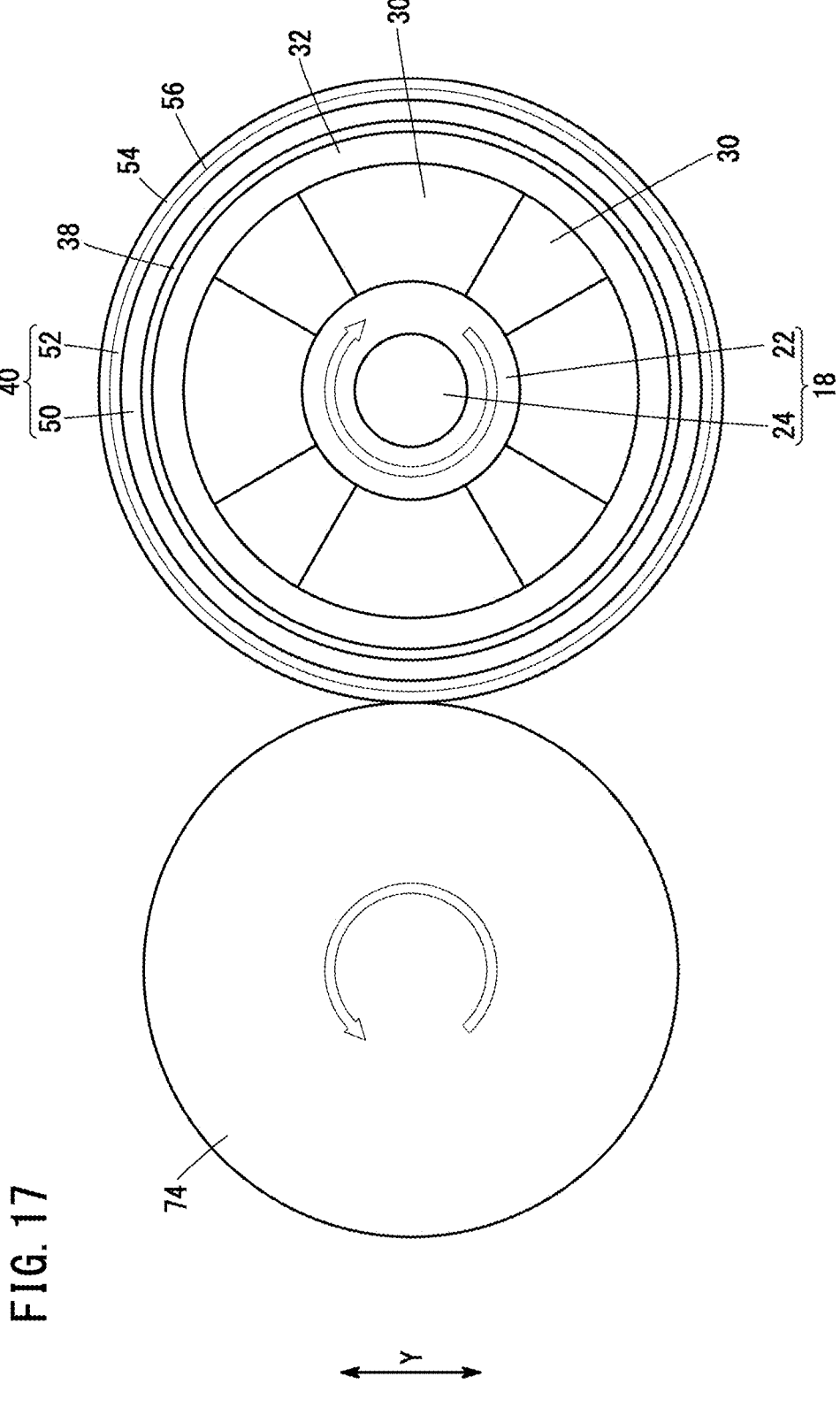
FIG. 17 is a schematic side view showing a state in which a load is applied to the resin film by the pressing roller.

When the heat-resistant double-sided tape 42 shown in FIG. 16 is used as the joining material 38, one end surface of the heat-resistant double-sided tape 42 is joined to the inner layer in advance. Thereafter, another end surface of the heat-resistant double-sided tape 42 is joined to the outer circumferential wall of the sleeve 32. After the resin film 40 is joined to the outer circumferential wall of the sleeve 32 via the heat-resistant double-sided tape 42 as described above, a pressing roller 74 is pressed against the resin film 40 while the rotating shaft 18 is rotated at a low speed, as shown in FIG. 17.

Figure 18:
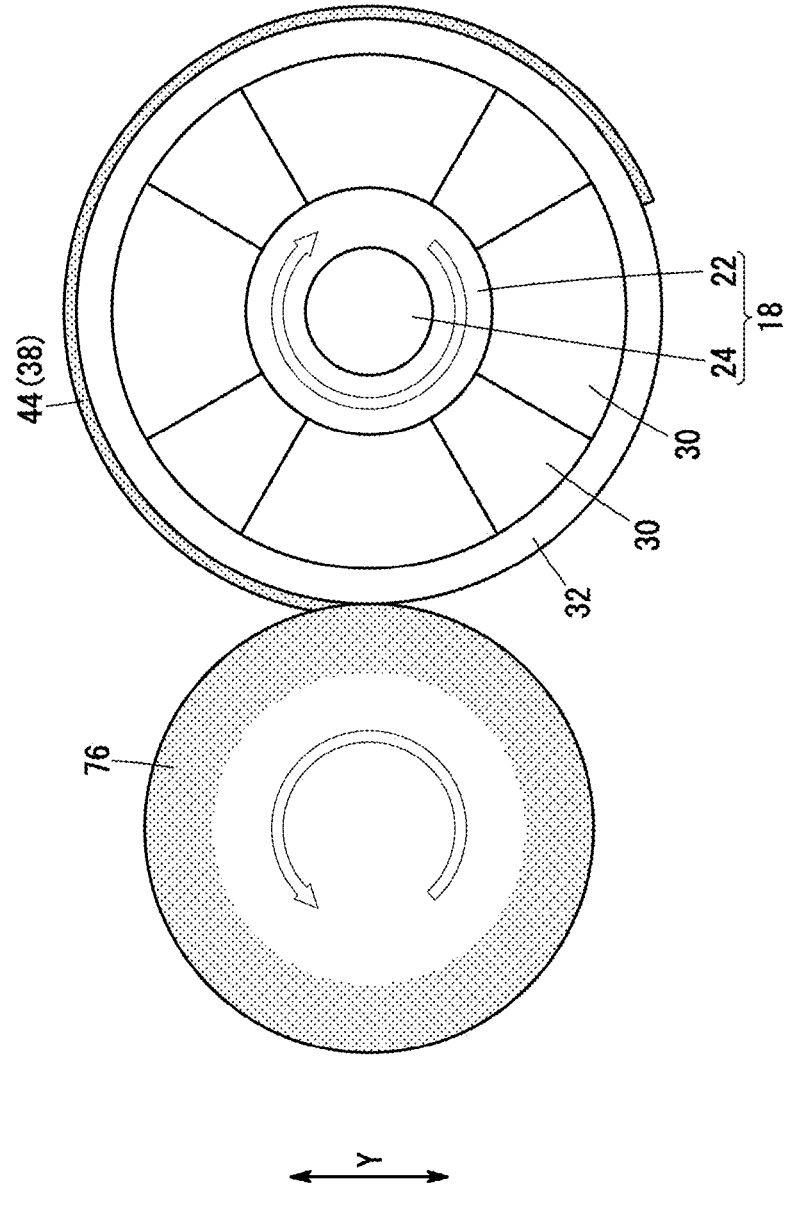
FIG. 18 is a schematic side view showing a state in which a heat-resistant adhesive as an example of a joining material is applied to an outer circumferential wall of the sleeve.

In the case that the heat-resistant adhesive 44 shown in FIG. 18 is used as the joining material 38, for example, an application roller 76 is pressed against the resin film 40 while the rotating shaft 18 is rotated at a low speed. At this time, the heat-resistant adhesive 44 exudes from the application roller 76. Since the rotating shaft 18 is rotating, the heat-resistant adhesive 44 is applied to the entire outer circumferential wall of the sleeve 32. Thereafter, the inner layer 50 of the resin film 40 is joined to the outer circumferential wall of the sleeve 32 via the heat-resistant adhesive 44. Further, in a similar manner as shown in FIG. 17, the pressing roller 74 is pressed against the resin film 40 while the rotating shaft 18 is rotated at a low speed.

For example, in the case that the length of the resin film along the axial direction of the sleeve 32 is larger than the length of the sleeve 32 in the axial direction, the resin film is cut before being joined to the sleeve 32. Alternatively, the resin film 40 may be cut after being joined to the sleeve 32.

On the outer layer 52 of the resin film 40, the ridges 54 as shown in FIGS. 3 to 10 are formed in advance. Between two adjacent ridges 54, a groove that is recessed relative to the two ridges 54 is formed. Therefore, by joining the resin film 40 to the outer circumferential wall of the sleeve 32 in the joining step ST3, the rotor 12 in which the riblets 56 are formed is obtained.

Figure 19:
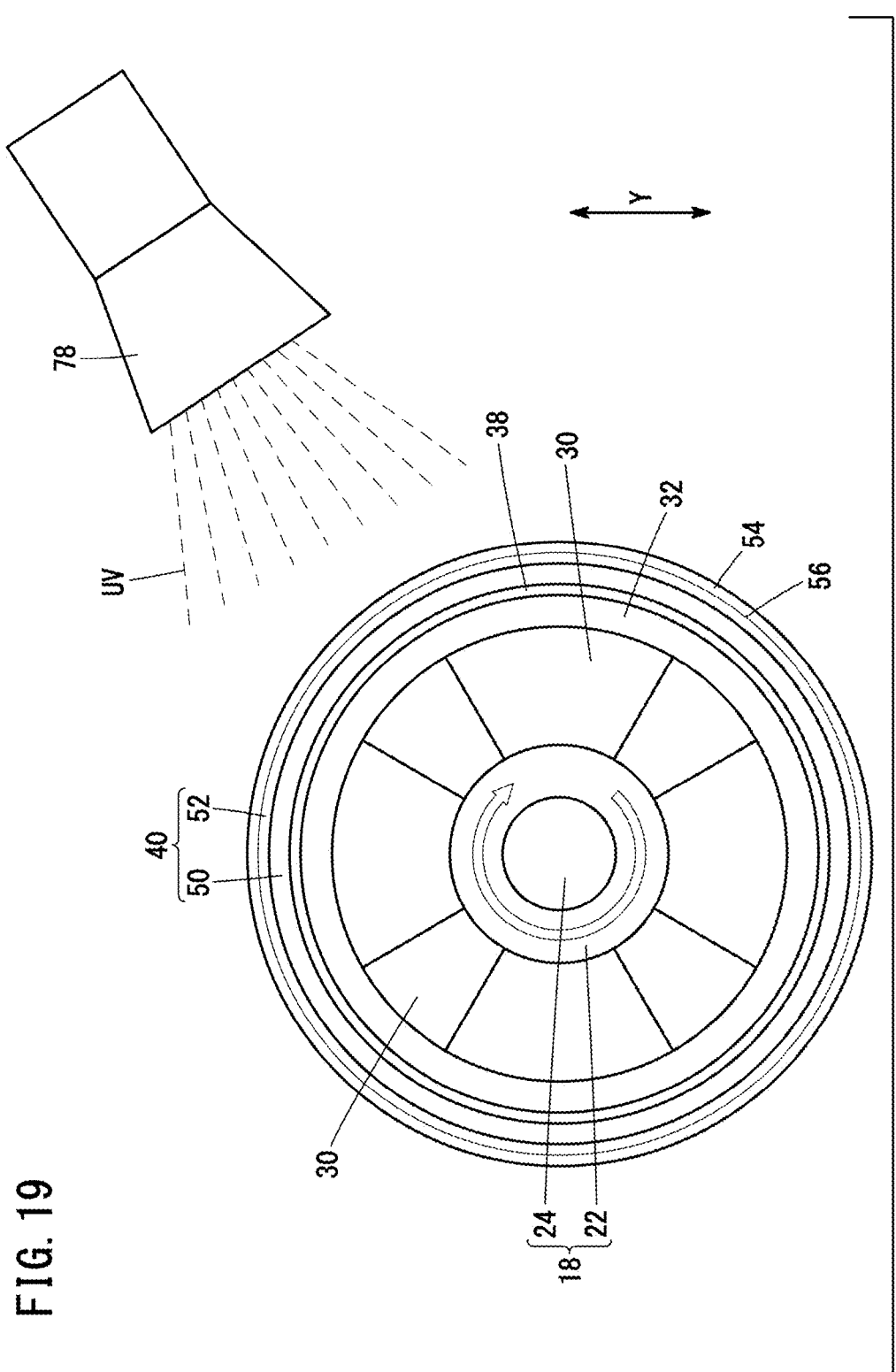
FIG. 19 is a schematic side view showing a state in which the resin film is irradiated with ultraviolet rays.

In the case that the material of the outer layer 52 is an ultraviolet curable resin, the ultraviolet irradiating step ST4 is performed. For example, the resin film 40 is irradiated with ultraviolet rays UV from an ultraviolet lamp 78 shown in FIG. 19. Accordingly, since the outer layer 52 is cured, the shape of the ridges 54 is easily maintained. Further, the outer layer 52 is sufficiently joined to the inner layer 50. When the material of the outer layer 52 is not the ultraviolet curable resin, it is not necessary to perform the ultraviolet irradiating step ST4.

Thereafter, the rotor 12 is left for a predetermined time. Alternatively, the rotor 12 may be heated. As described above, the rotor 12 is obtained, in which the resin film 40 is joined to the outer circumferential wall of the sleeve 32 and the riblets 56 are formed in the resin film 40.

As described above, the present embodiment discloses the rotating electric machine (10) including the rotor (12) and the stator (14), the rotor including the rotating shaft (18) and the permanent magnet (30) held on the rotating shaft, and the stator including the electromagnetic coil (36) surrounding the permanent magnet, wherein the rotor includes the sleeve (32) covering the outer surface of the permanent magnet on the rotating shaft and being spaced apart from the stator by the predetermined distance, and the resin film (40) joined to the outer circumferential wall of the sleeve via the joining material (38), and wherein the sleeve is made of the carbon fiber reinforced polymer, the ridge structure is formed on the outer circumferential wall of the resin film, the ridge structure including the one or plurality of convex portions forming the plurality of ridges (54) extending parallel to each other, and the riblet (56) recessed relative to the plurality of ridges is formed between the plurality of ridges.

The riblet is formed between the two ridges adjacent to each other. The riblet reduces the turbulent vortex generated around the rotor even when the rotor rotates at a high speed. As a result, the turbulent flow friction viscosity is lowered and the generation of the Taylor vortex is suppressed. For the reasons described above, the windage loss can be reduced.

As a result, the permanent magnet is prevented from heating up. Therefore, a decrease in the magnetic force of the permanent magnet is avoided, so that the energy conversion efficiency in the rotating electric machine is sufficiently increased.

The present embodiment discloses the method of manufacturing the rotor (12) that includes the rotating shaft (18) and the permanent magnet (30) held on the rotating shaft and is surrounded by the stator (14) in the rotating electric machine (10), the method including the sleeve attaching step (ST1) of covering the outer surface of the permanent magnet by the sleeve (32) made of the carbon fiber reinforced polymer, and the joining step (ST3) of joining the resin film (40) to the outer circumferential wall of the sleeve via the joining material (38), wherein the ridge structure is formed in advance on the outer circumferential wall of the resin film, and the joining step is performed to obtain the rotor in which the ridge structure is formed as the one or plurality of convex portions forming the plurality of ridges (54) extending in parallel to each other, and the riblet (56) recessed relative to the plurality of ridges is formed between the plurality of ridges.

In the present embodiment, the sleeve is made of carbon fiber reinforced polymer. Also, the sleeve is generally thin-walled. In general, it is difficult to perform processing such as machining on a thin carbon fiber reinforced polymer. Therefore, it is not easy to form a ridge on the outer circumferential wall of the sleeve.

On the other hand, in the present embodiment, the sleeve is covered with the resin film, and the resin film is formed with the ridges. Therefore, by joining the resin film to the sleeve, the riblets are formed in the resin film covering the outer circumferential wall of the sleeve. Therefore, it is not necessary to perform machining such as cutting on the outer circumferential wall of the sleeve. For this reason, the occurrence of breakage such as cracking in the sleeve is avoided.

The present embodiment discloses the rotating electric machine, wherein the extending direction of the plurality of ridges is the direction intersecting the axial direction (X) of the rotating shaft at the angle (e) of 45° to 90°.

The present embodiment discloses the method of manufacturing the rotor, wherein in the joining step, the resin film is joined to the sleeve in the manner so that the plurality of ridges extend in the direction intersecting with the axial direction (X) of the rotating shaft at an angle (e) of 45° to 90.

By setting the intersection angle of the ridges relative to the axial direction of the rotating shaft to be within the above-described range, generation of turbulence in the air layer between the sleeve and the stator is avoided when the rotor shaft rotates in the rotating electric machine.

The present embodiment discloses the rotating electric machine, wherein when the height of each of the plurality of ridges is H and the pitch between two adjacent ridges among the plurality of ridges is S, S is 100 μm or less and the following equation is satisfied:

$$H=0.5S.$$

The present embodiment discloses the method of manufacturing the rotor, wherein when the height of each of the plurality of ridges is H and the pitch between two adjacent ridges among the plurality of ridges is S, the plurality of ridges are formed on the resin film so as to satisfy the following equation:

$$H=0.5S.$$

By setting the pitch S to 100 μm or less, the windage loss can be sufficiently reduced even when the rotor rotates at a high speed. In addition, by setting the height H to ½ times the pitch S, the aspect ratio of the riblet becomes sufficiently large. This also makes it possible to sufficiently reduce windage loss when the rotor rotates at a high speed.

The present embodiment discloses the rotating electric machine, when the plurality of ridges are cut in the direction orthogonal to the extending direction of the plurality of ridges, the cross-sectional shape of each of the plurality of ridges is a triangle.

The present embodiment discloses the method of manufacturing the rotor, wherein when the plurality of ridges are cut in the direction orthogonal to the extending direction of the plurality of ridges, the plurality of ridges are formed on the resin film, in the manner so that the cross-sectional shape of each of the plurality of ridges is a triangle.

When the cross-sectional shape is a triangle, the ridges can be formed more easily than ridges having another cross-sectional shape.

The present embodiment discloses the rotating electric machine, wherein when the plurality of ridges are cut in the direction orthogonal to the extending direction of the plurality of ridges, the top portion (58) in the cross section of each of the ridges has the angle (α) of 30° to 90°, the top portion protruding most outward in the diametrical direction of the rotating shaft.

The present embodiment discloses the method of manufacturing the rotor, wherein when the plurality of ridges are cut in the direction orthogonal to the extending direction of the plurality of ridges, the plurality of ridges are formed on the resin film in the ridge forming step, in the manner so that the top portion (58) in the cross section of each of the ridges has the angle (α) of 30° to 90°, the top portion protruding most outward in the diametrical direction of the rotating shaft.

By setting the angle of the top portion to be within such a range, the ridges can be formed more easily than each of the ridges whose top portion has an angle outside the above-described range.

The present embodiment discloses the rotating electric machine, wherein the resin film includes the inner layer (50) covering the outer circumferential wall of the sleeve via the joining material and the outer layer (52) covering the outer circumference of the inner layer, and the outer layer is made of the ultraviolet curable resin.

The present embodiment discloses the method of manufacturing the rotor, wherein the resin film includes the inner layer (50) covering the outer circumferential wall of the sleeve via the joining material and the outer layer (52) covering the outer circumference of the inner layer, the outer layer is made of the ultraviolet curable resin, and the method further includes the ultraviolet irradiating step (ST4) of irradiating the outer layer with the ultraviolet ray (UV) after the joining step.

For example, the material of the inner layer can be a resin that is easily joined to the carbon fiber reinforced polymer via the joining material, while the material of the outer layer can be a resin that is excellent in weather resistance and scratch resistance. By combining the inner layer and the outer layer in this manner, a resin film having excellent properties can be obtained.

The present embodiment discloses the rotating electric machine, wherein the sleeve includes the plurality of divided pieces (34a to 34c) arranged in the axial direction of the rotating shaft.

The present embodiment discloses the method of manufacturing the rotor, wherein in the sleeve attaching step, the plurality of divided pieces (34a to 34c) are attached to the rotor in the axial direction of the rotating shaft to form the sleeve from the plurality of divided pieces.

The length of each of the divided pieces in the axial direction is smaller than the length of the sleeve in the axial direction. As compared with a case where a sleeve made of a long single member is manufactured, it is easy to manufacture short divided pieces. That is, in this case, the sleeve can be easily obtained.

The present embodiment discloses the method of manufacturing the rotor, wherein before the joining step, machining (ST2) is performed on the plurality of divided pieces to align positions of outer circumferential walls of the plurality of divided pieces.

As a result, a sleeve having a step difference in the outer circumferential wall within an allowable range is obtained. Therefore, it is possible to prevent the resin film joined to the outer circumferential wall of the sleeve from having a step exceeding the allowable range.

Moreover, it should be noted that the present invention is not limited to the disclosure described above, but various configurations may be adopted therein without departing from the essence and gist of the present invention.

The invention claimed is:

1. A method of manufacturing a rotor that includes a rotating shaft and a permanent magnet held on the rotating shaft and is surrounded by a stator in a rotating electric machine, the method comprising:

covering an outer surface of the permanent magnet by a sleeve made of a carbon fiber reinforced polymer to attach the sleeve; and joining a resin film to an outer circumferential wall of the sleeve via a joining material, wherein a ridge structure is formed in advance on an outer circumferential wall of the resin film, the joining of the resin film is performed to obtain the rotor in which the ridge structure is formed as one or a plurality of convex portions forming a plurality of ridges extending in parallel to each other, and a riblet recessed relative to the plurality of ridges is formed between the plurality of ridges, and the resin film includes an inner layer covering the outer circumferential wall of the sleeve via the joining material and an outer layer covering an outer circumference of the inner layer, the outer layer is made of an ultraviolet curable resin, and the method further comprises irradiating the outer layer with an ultraviolet ray after the joining of the resin film.

2. The method of manufacturing the rotor according to claim 1, wherein in the joining of the resin film, the resin film is joined to the sleeve in a manner so that the plurality of ridges extend in a direction intersecting with an axial direction of the rotating shaft at an angle of 45° to 90°.

3. The method of manufacturing the rotor according to claim 1, wherein when a height of each of the plurality of ridges is H and a pitch between two adjacent ridges among the plurality of ridges is S, the plurality of ridges are formed on the resin film so as to satisfy a following equation:

$$H = 0.5S.$$

4. The method of manufacturing the rotor according to claim 1, wherein when the plurality of ridges are cut in a direction orthogonal to an extending direction of the plurality of ridges, the plurality of ridges are formed on the resin film, in a manner so that a cross-sectional shape of each of the plurality of ridges is a triangle.

5. The method of manufacturing the rotor according to claim 1, wherein when the plurality of ridges are cut in a direction orthogonal to an extending direction of the plurality of ridges, the plurality of ridges are formed on the resin film, in a manner so that a top portion in a cross section of each of the ridges has an angle of 30° to 90°, the top portion protruding most outward in a diametrical direction of the rotating shaft.

6. The method of manufacturing the rotor according to claim 1, wherein in the covering of the outer surface of the permanent magnet to attach the sleeve, a plurality of divided pieces are attached to the rotor in an axial direction of the rotating shaft to form the sleeve from the plurality of divided pieces.

7. The method of manufacturing the rotor according to claim 6, wherein before the joining of the resin film, machining is performed on the plurality of divided pieces to align positions of outer circumferential walls of the plurality of divided pieces.

* * * * *